(12) United States Patent
Gamadia et al.

(10) Patent No.: US 11,856,293 B2
(45) Date of Patent: *Dec. 26, 2023

(54) CAMERA AUTOFOCUS USING TIME-OF-FLIGHT ASSISTANCE

(71) Applicant: Apple Inc., Cupertino, CA (US)

(72) Inventors: Mark N. Gamadia, Campbell, CA (US); Abhishek Dhanda, San Ramon, CA (US); Gregory Guyomarc'h, San Francisco, CA (US); Andrew D. Fernandez, San Jose, CA (US); Moshe Laifenfeld, Haifa (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,395

(22) Filed: Dec. 2, 2022

(65) Prior Publication Data

US 2023/0094971 A1 Mar. 30, 2023

Related U.S. Application Data

(63) Continuation of application No. 17/485,258, filed on Sep. 24, 2021, now Pat. No. 11,523,043.

(60) Provisional application No. 63/090,594, filed on Oct. 12, 2020.

(51) Int. Cl.
*H04N 23/67* (2023.01)
(52) U.S. Cl.
CPC .................. *H04N 23/671* (2023.01)
(58) Field of Classification Search
CPC ... G02B 7/36; G02B 7/34; G02B 7/40; G02B 7/285; H04N 5/232121; G06T 7/521; G06T 7/55; G06T 7/586; G06T 2207/10012; G06T 2207/10048; G06T 2207/10028; G01S 17/894; G01S 17/86; G01S 17/08; G01S 17/46; G01B 11/25; G06K 7/10801; G06K 7/10732; G06K 7/1426;

(Continued)

(56) References Cited

U.S. PATENT DOCUMENTS

| | | | |
|---|---|---|---|
| 7,505,121 B2 * | 3/2009 | Yamaguchi | G01C 3/08 356/28 |
| 8,139,141 B2 * | 3/2012 | Bamji | H04N 23/54 348/335 |
| 9,704,250 B1 | 7/2017 | Shah et al. | |

(Continued)

FOREIGN PATENT DOCUMENTS

| | | |
|---|---|---|
| CN | 111526282 A | 8/2020 |
| EP | 3040754 A1 | 7/2016 |
| WO | 2021000063 A1 | 1/2021 |

OTHER PUBLICATIONS

International Search Report and Written Opinion from PCT/US2021/054030, dated Apr. 4, 2022, pp. 1-18.

*Primary Examiner* — Pritham D Prabhakher
(74) *Attorney, Agent, or Firm* — Robert C. Kowert; Kowert, Hood, Munyon, Rankin & Goetzel, P.C.

(57) ABSTRACT

Various embodiments disclosed herein include techniques for determining autofocus for a camera on a mobile device. In some instances, depth imaging is used to assist in determining a focus position for the camera through an autofocus process. For example, a determination of depth may be used to determine a focus position for the camera. In another example, the determination of depth may be used to assist another autofocus process.

20 Claims, 16 Drawing Sheets

(58) Field of Classification Search
CPC ........... G06K 7/10881; G06K 7/10792; G06K 7/10811; G06K 2007/10524; G06K 2007/10504
USPC .................................................. 348/207.99
See application file for complete search history.

(56) References Cited

U.S. PATENT DOCUMENTS

| | | | |
|---|---|---|---|
| 9,779,276 | B2 | 10/2017 | Todeschini et al. |
| 9,971,937 | B1 | 5/2018 | Ovsiannikov et al. |
| 10,250,794 | B2 | 4/2019 | Chen et al. |
| 10,250,795 | B2 * | 4/2019 | Chen ...................... G02B 7/285 |
| 10,311,298 | B2 | 6/2019 | Ovsiannikov et al. |
| 10,444,359 | B2 * | 10/2019 | Pacala .................... G02B 26/10 |
| 10,607,351 | B2 | 3/2020 | Varekamp et al. |
| 10,613,417 | B2 | 4/2020 | Mun et al. |
| 10,761,292 | B2 * | 9/2020 | O ........................... H04N 23/45 |
| 10,764,486 | B2 | 9/2020 | Lee et al. |
| 10,944,903 | B2 * | 3/2021 | Chang ................. H04N 23/951 |
| 11,016,268 | B2 * | 5/2021 | Shmunk ............. G02B 13/0015 |
| 11,039,117 | B2 * | 6/2021 | Chen ........................ G02B 7/09 |
| 11,307,293 | B2 | 4/2022 | Hiramatsu et al. |
| 11,310,409 | B2 * | 4/2022 | Li ....................... H04M 1/0264 |
| 11,310,412 | B2 * | 4/2022 | Zhou ....................... G01S 17/08 |
| 11,523,043 | B2 | 12/2022 | Gamadia et al. |
| 2005/0285966 | A1 * | 12/2005 | Bamji ...................... G01C 3/08 348/E9.005 |
| 2006/0244945 | A1 * | 11/2006 | Yamaguchi .............. G01C 3/08 356/5.03 |
| 2007/0097349 | A1 * | 5/2007 | Wada ................... G01S 7/4915 356/4.06 |
| 2015/0023563 | A1 | 1/2015 | Koppal |
| 2016/0295097 | A1 | 10/2016 | Shanmugavadivelu et al. |
| 2017/0070662 | A1 | 3/2017 | Honkanen |
| 2017/0358094 | A1 | 12/2017 | Sun et al. |
| 2017/0366737 | A1 | 12/2017 | Yang et al. |
| 2018/0268215 | A1 | 9/2018 | Ovsiannikov et al. |
| 2018/0341009 | A1 * | 11/2018 | Niclass ................. G01S 7/4817 |
| 2019/0011556 | A1 * | 1/2019 | Pacala ................... G01S 7/4817 |
| 2019/0037128 | A1 * | 1/2019 | Wang ..................... H04N 23/45 |
| 2019/0041519 | A1 * | 2/2019 | Spickermann .......... G01S 17/36 |
| 2019/0049821 | A1 | 2/2019 | Mun et al. |
| 2019/0094342 | A1 | 3/2019 | Hiramatsu et al. |
| 2019/0231226 | A1 | 8/2019 | Kiaei et al. |
| 2019/0266693 | A1 | 8/2019 | Wiseman et al. |
| 2020/0005006 | A1 | 1/2020 | Muller et al. |
| 2020/0065986 | A1 | 2/2020 | Chen et al. |
| 2020/0120260 | A1 * | 4/2020 | Li ........................ H04N 23/651 |
| 2021/0168348 | A1 | 6/2021 | Agankos et al. |

* cited by examiner

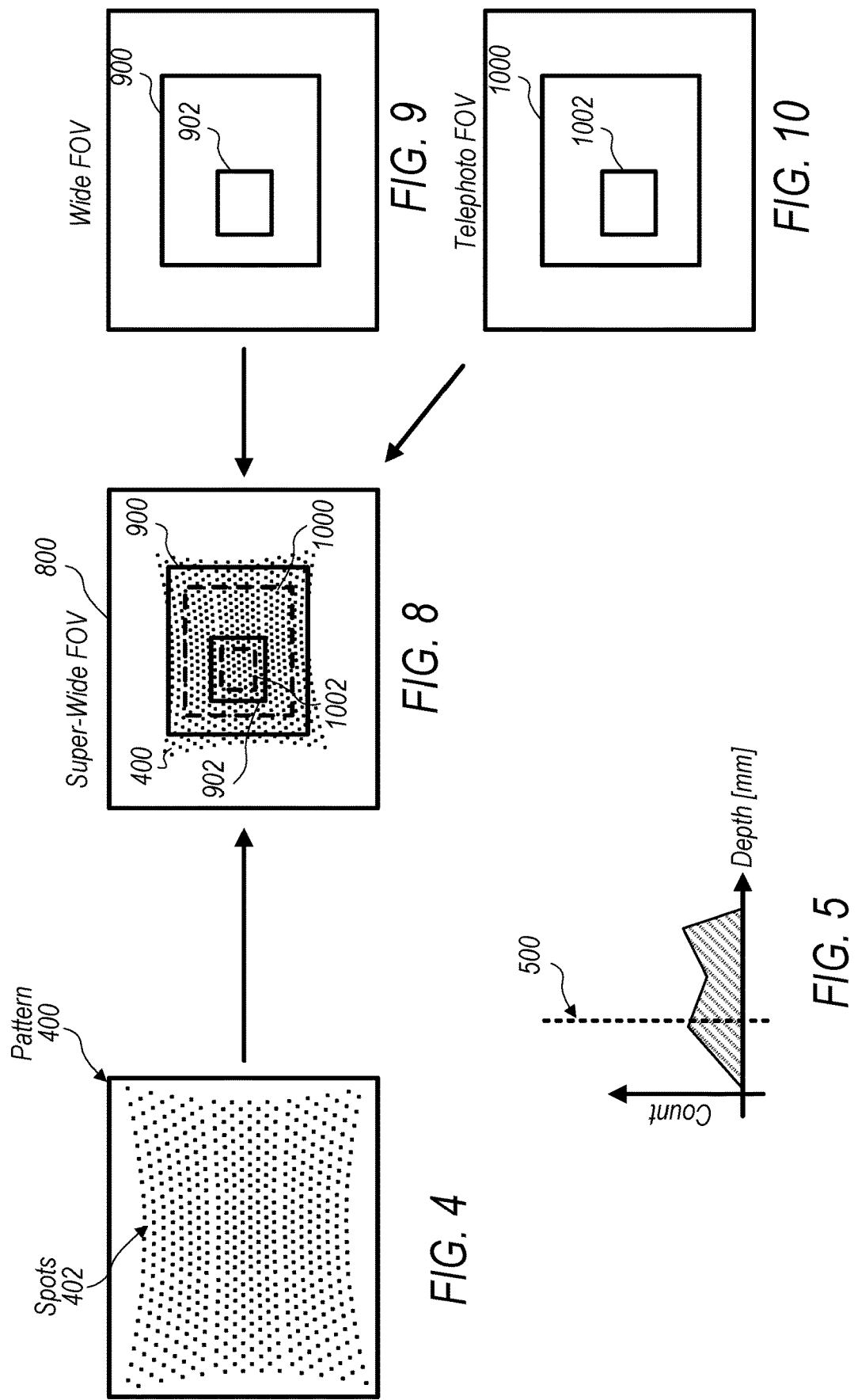

CAMERA AUTOFOCUS USING TIME-OF-FLIGHT ASSISTANCE

PRIORITY CLAIM

This application is a continuation of U.S. patent application Ser. No. 17/485,258, filed Sep. 24, 2021, which claims benefit of priority to U.S. Provisional Application Ser. No. 63/090,594, entitled "Camera Autofocus Using Time-of-Flight Assistance," filed Oct. 12, 2020, and which are hereby incorporated herein by reference in their entirety.

BACKGROUND

Technical Field

Embodiments described herein relate to camera systems. More particularly, embodiments described herein relate to methods for providing autofocus in camera systems.

Description of the Related Art

The advent of small, mobile multipurpose devices such as smartphones and tablet or pad devices has resulted in a need for high-resolution, small form factor cameras for integration in the devices. Such cameras may include an autofocus (AF) mechanism to adjust the camera's focal distance to focus an object plane or field in front of the camera at an image plane to be captured by an image sensor. In some such autofocus mechanisms, the optical lens is moved along the optical axis of the camera to focus and refocus the camera.

Many mobile devices implement passive autofocus systems to provide autofocus. Examples of passive autofocus systems include, but are not limited to, phase detection autofocus and contrast based autofocus. In the instance of mobile device cameras, phase detection autofocus (PDAF) may be achieved by splitting a camera pixel into multiple separate photodiodes or selectively masking a portion of a pixel to generate asymmetric pixels. Each asymmetric pixel preferentially receives light from a given direction, and pixels associated with a common direction can be grouped together. The groups of pixels will have disparate signals when the image is not in focus but well matched signals when the image is in focus. Thus, the groups of pixels may provide information that can be used by an AF mechanism to adjust the focus of an image (e.g., using phase difference between the groups of pixels). An example of PDAF on mobile devices is described in U.S. Pat. No. 10,440,301 to Li et al., which is incorporated by reference as if fully set forth herein. PDAF is most commonly used in mobile devices as PDAF processing provides fast and accurate autofocusing. PDAF, however, has issues determining focus positions in low light conditions or on flat textures because it is difficult to determine any separation between the pairs of images.

Contrast based autofocus (CBAF) is achieved by measuring contrast within a sensor field through a lens. The intensity difference between adjacent pixels of the sensor naturally increases with correct image focus. Thus, the focus position can be adjusted until a maximum contrast is determined. CBAF may be available for a wider range of use situations (e.g., wide range of light levels) than PDAF but CBAF is slower to determine the focus position, which may limit the camera's ability to quickly set a focus position. Additionally, CBAF may have difficulty in tracking moving objects.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which:

FIG. 4 depicts a representation of an embodiment of a light pattern received by a depth imaging system.

FIG. 5 depicts an example histogram for determining the depth of a subject.

FIG. 8 depicts a representation of an embodiment of a received light pattern projected on a super wide lens field of view.

FIG. 9 depicts a representation of embodiments of ROIs (regions of interest) from a wide lens field of view.

FIG. 10 depicts a representation of embodiments of ROIs from a telephoto lens field of view.

Figure 1A:
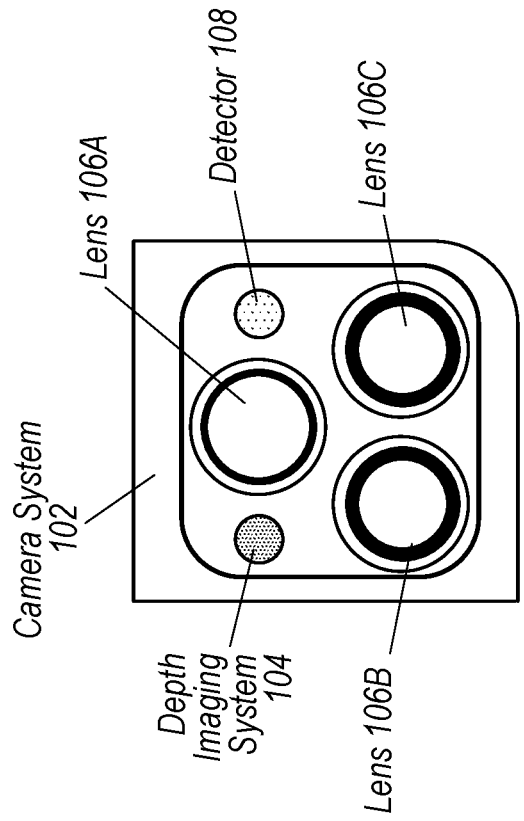
FIG. 1A depicts a representation of an embodiment of a camera system on a mobile device.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Figure 1:
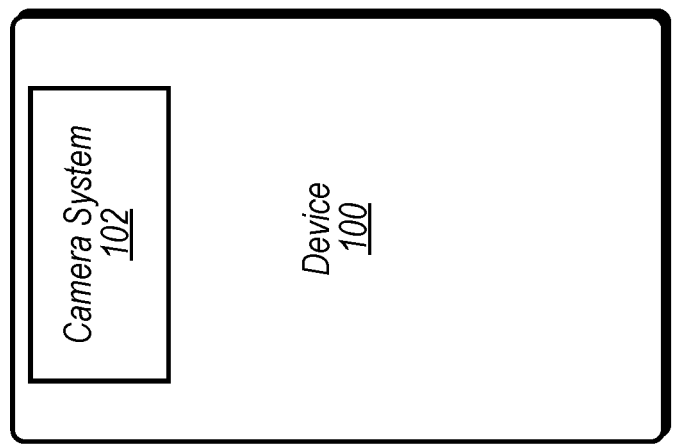
FIG. 1 depicts a representation of an embodiment of a mobile device.

FIG. 1 depicts a representation of an embodiment of mobile device 100. Device 100 may be a small multipurpose computing device including any of various types of a computer system device that is mobile or portable and is capable of performing wireless communication. Examples of mobile devices include, but are not limited to, cell phones, smartphones, pad or tablet computing devices, laptop, netbook, notebook, subnotebook, and ultrabook computers. Various other types of devices may fall into this category if they include wireless or RF communication capabilities (e.g., Wi-Fi, cellular, and/or Bluetooth) and have a camera, such as portable gaming devices, portable Internet devices, and other handheld devices, as well as wearable devices. As described herein, the term "mobile device" may be defined to encompass any multipurpose electronic, computing, and/or telecommunications device (or combination of devices) that is easily transported by a user, is capable of wireless communication (using, for example, WLAN, Wi-Fi, cellular, and/or Bluetooth), and has a camera, where the device's primary purpose is telecommunication, computing, and/or electronic gaming.

In certain embodiments, device 100 includes camera system 102. Camera system 102 may include one or more cameras. Camera system 102 may include cameras located either front-facing on device 100 (e.g., facing on same side as a display of the mobile device) and/or back-facing on the device (e.g., facing on an opposite side as the display). In some embodiments, camera system 102 may include multiple cameras. For example, camera system 102 may include cameras that provide different fields of view such as telephoto, wide angle, super wide angle, etc. Each camera may have its own set of one or more lenses and an image sensor (e.g., image sensor 202, described below). The multiple cameras or lenses may be operated together or independently. In some embodiments, one camera is used for preview imaging (e.g., previewing the image on a display of device 100). An example of a multiple camera system is described in U.S. Pat. No. 10,429,608 to Baer et al., which is incorporated by reference as if fully set forth herein.

FIG. 1A depicts a representation of an embodiment of camera system 102 on device 100. In the illustrated embodiment, camera system 102 includes depth imaging system 104, lenses 106, and detector 108. Depth imaging system 104 is described in further detail below. In various embodiments, detector 108 is a flicker detector. Flicker detectors may provide detection for automatic white balancing (AWB) or autoexposure (AE) determination in camera system 102.

In the illustrated embodiments, lenses 106 includes three lenses 106A, 106B, 106C. Embodiments with other numbers of lenses may, however, also be contemplated. In certain embodiments, lenses 106A, 106B, 106C include a telephoto lens, a wide-angle lens, and a super-wide-angle lens. In various embodiments, lenses 106, depth imaging system 104, and detector 108 are placed in close proximity to each other such that the components have similar field-of-views in camera system 102. For example, lenses 106, depth imaging system 104, and detector 108 may be positioned within about 2-3 cm of each other.

Figure 2:
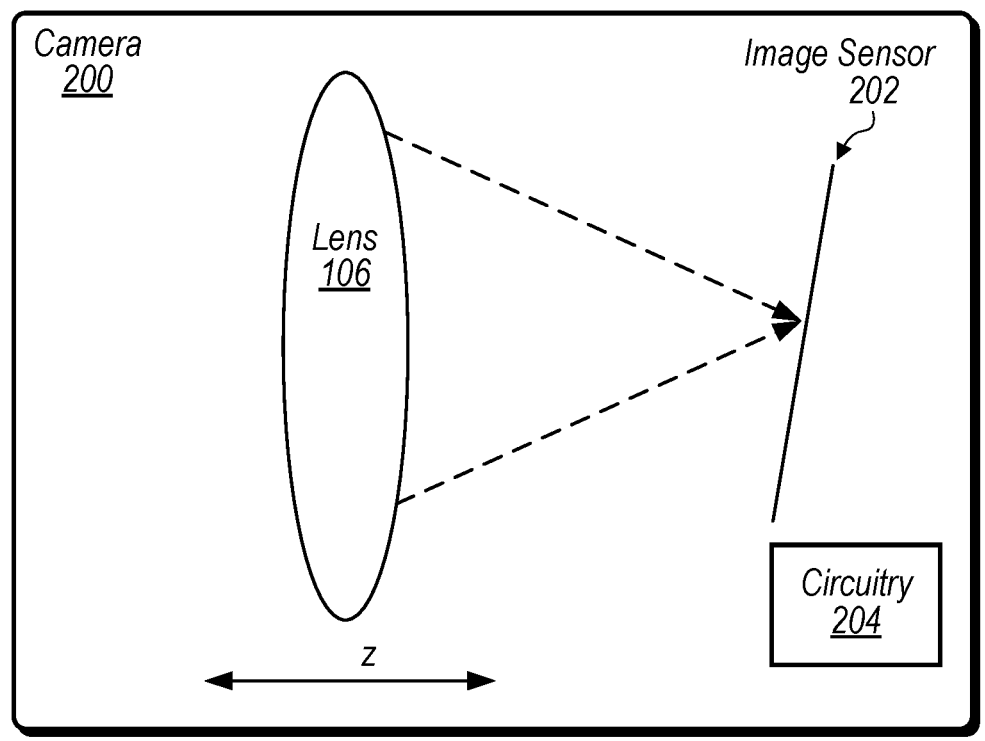
FIG. 2 depicts a side view representation of an embodiment of a camera showing a lens and an image sensor.

In certain embodiments, as described above, a camera may include one or more lenses and an image sensor. FIG. 2 depicts a side view representation of an embodiment of camera 200 showing lens 106 and image sensor 202. While camera 200 is shown to include one lens (e.g., lens 106) in the depicted embodiment, it is to be understood that the number of lenses in the camera may vary. For example, camera 200 may include a stack of lenses that operate together in combination with image sensor 202. In embodiments with multiple cameras, different cameras with different lenses may be used for different modes on device 100. For example, one camera may include a wide angle lens for a wide angle field of view, a second camera may include a telephoto lens for a magnified field of view, and/or a third camera may include a super wide angle lens for large fields of view. As described above, each camera 200 may have its own corresponding image sensor 202.

As shown in FIG. 2, lens 106 focuses incident light towards image sensor 202. In certain embodiments, camera 200 includes an autofocus position system that implements autofocus mechanisms for focusing camera 200. For example, in some embodiments, an autofocus mechanism may control a position of lens 106 with respect to image sensor 202 (e.g., along the optical axis or z-direction, as shown by the arrow in FIG. 2) to provide focusing capabilities for camera 200. Adjusting (e.g., controlling) the position of lens 106 adjusts the camera's focal distance to focus an object plane or field in front of camera 200 at an image plane to be captured by image sensor 202. Examples of autofocus mechanisms for providing focus in cameras is described in U.S. Pat. No. 10,365,121 to Wong et al. and U.S. Pat. No. 10,303,041 to Sharma, both of which are incorporated by reference as if fully set forth herein. In some embodiments, the position of lens 106 relative to image sensor 202 corresponds to a practical focal length (PFL) of the lens. The practical focal length may be determined using autofocus processes described herein.

In certain embodiments, camera 200 implements one or more camera-based autofocus processes to determine the position of lens 106 for focus on a subject in the field of view of the camera. An autofocus process may determine a position of lens 106 that provides focus on a particular object plane or field in front of camera 200. Examples of autofocus processes include, but are not limited to, phase detection autofocus (PDAF) and contrast based autofocus (CBAF). In certain embodiments, camera 200 is capable of operating both phase detection autofocus (PDAF) and contrast based autofocus (CBAF). Processes for determining which autofocus process to implement are described herein.

In certain embodiments, image sensor 202 receives light projected through lens 106 and converts the light to data representing an image. Image sensor 202 may be, for example, an optical sensor. FIGS. 19-22 illustrate example mobile devices with example cameras including example optical sensors (e.g., optical sensor 1964). Image sensor 202, along with circuitry 204 coupled to the image sensor, may generate one or more images or video captured by the image sensor. In some embodiments, the images or video are displayed on a display of device 100 or stored in a memory of the device.

Returning to FIG. 1A, in the illustrated embodiment, camera system 102 includes depth imaging system 104. Depth imaging system 104 may implement one or more depth sensing technologies to determine depth at one or more different points in a scene that is being captured by camera 200 or another camera in camera system 102. Examples of depth sensing technologies that may be implemented in depth imaging system 104 include, but are not limited to, stereoscopic depth, structured pattern illumination, illuminating in a fixed pattern, scanning illumination (e.g., scanning a line across a field-of-view), and direct or indirect time-of-flight.

In certain embodiments, depth imaging system 104 is a time-of-flight (ToF) imaging system. In a ToF imaging system, the imaging system may illuminate a scene (e.g., a field of view of camera 200) in front of device 100 (e.g., a subject in the field of view being captured by camera 200) with illumination. In some embodiments, the illumination includes patterned illumination. Patterned illumination may include, for example, a plurality of dots, spots, lines, or other shaped objects projected simultaneously in a pattern. For scanning illumination, one or more objects (e.g., lines) may be scanned across a field-of-view of depth imaging system 104. The pattern or scan produced by depth imaging system 104 may be a predetermined and known pattern/scan generated by an illuminator in the ToF imaging system. The illuminator may be, for example, a laser illuminator or LED illuminator. In certain embodiments, illumination from the ToF imaging system is invisible to the naked eye of a user. For example, the illumination may be infrared illumination or another illumination with a wavelength outside the visible wavelength range. An example of a ToF imaging system is described in U.S. Patent Application Publication No. 2018/0209846 to Mandai et al., which is incorporated by reference as if fully set forth herein.

Figure 3:
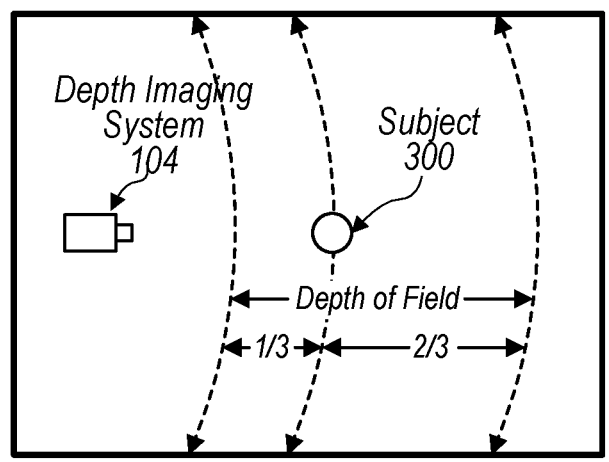
FIG. 3 depicts a top view representation of an embodiment of a depth imaging system determining depth of a subject.

FIG. 3 depicts a top view representation of an embodiment of depth imaging system 104 determining depth of subject 300. In the illustrated embodiment, depth imaging system 104 is a ToF imaging system. Depth imaging system 104 measures a time that each light object takes to return to the depth imaging system (e.g., the time-of-flight of each light object) when subject 300 is illuminated by the depth imaging system. Subject 300 may be, for example, in the field of view being captured by camera 200. Distance between subject 300 and device 100 (e.g., depth imaging system 104) may be determined based on the time-of-flight measurements.

FIG. 4 depicts a representation of an embodiment of a light pattern received by depth imaging system 104 when the depth imaging system is a ToF imaging system. Pattern 400 is an example of a light pattern that may be received by the ToF imaging system after illuminating the field of view with an illuminator. For example, pattern 400 may be a point cloud pattern of spots 402. Spots 402 may be received by depth imaging system 104 in pattern 400. Individual spots 402 have time-of-flight values (e.g., times between transmission and receiving of the individual spots) that are determined by the distance between the subject reflecting the light and depth imaging system 104 (e.g., the distance between depth imaging system 104 and subject 300, shown in FIG. 3).

In certain embodiments, the confidence of the time-of-flight measurement of spots 402 is determined. Confidence may be an indicator of strength of the received signal for each spot 402. Confidence in the measurement of spots 402 may be determined, for example, based on signal intensity, contrast, responsivity, integration time (related to determination of time-of-flight) or other factors. Confidence may be determined to inhibit interpreting noise and artifacts in received by a sensor in depth imaging system 104 as a valid depth reading. After high confidence readings are determined, signal-to-noise ratio (SNR) may also be determined for each spot 402. SNR may be used as a metric of a precision of the depth reading. Typically, the higher the confidence in a spot, the higher the SNR for the spot. Confidence and SNR data may be utilized to determine spots 402 used for depth determination, as described herein. In some embodiments, only spots 402 with high confidence and high SNR may be used for determining depth (e.g., only spots with confidence and SNR above predetermined levels or within predetermined ranges are used for determining depth). Utilizing only spots 402 with high confidence and high SNR may increase the accuracy and stability in determining depth from the spots.

In certain embodiments, depth imaging system 104 is used determine a "target" in a scene (e.g., a target depth of subject 300, shown in FIG. 3). The target depth in the scene determined by depth imaging system 104 may be used to determine a depth to which camera 200 should be focused. In some embodiments, depth imaging system 104 assesses the time-of-flight properties of spots 402 to determine the target depth in the scene. In some embodiments, depth imaging system 104 assesses all spots 402 in the scene to determine the target depth in the scene. In some embodiments, depth imaging system 104 assesses a reduced number of spots 402 in the scene to determine the target depth in the scene. For example, some spots may be excluded based on their confidence being below a selected level. Thus, in such embodiments, high confidence spots 402 (e.g., spots with confidence above the selected level) may be assessed to determine the target depth in the scene.

In certain embodiments, the depth of subject 300 is assessed using histogram analysis (e.g., distribution function) analysis of high confidence spots 402. FIG. 5 depicts an example histogram for determining the depth of subject 300. In FIG. 5, the count of the number of spots 402 at each depth (e.g., the cumulative distribution function of the spots) are plotted versus the depth. In some embodiments, the histogram is weighted using the SNR of spots 402. The depth of subject 300 may be determined using the percentile depth in the histogram. For example, a rule of thirds may be applied and the depth is determined as the 33⅓ percentile in the histogram (shown by vertical dashed line 500). It is to be understood that histogram analysis of depth of spots 402 to determine depth of subject 300 is provide as one example embodiment for determining depth of the subject using a time-of-flight system and that other analysis methods may be contemplated based on what is appropriate for an image capture use case.

With depth of a subject being determinable by depth imaging system 104, the depth of the subject (e.g., subject 300, shown in FIG. 3) may be used to determine a focus position (e.g., a position of one or more lenses) for camera 200. For example, a depth-to-position model, as described herein, may be implemented to translate depth of the subject to a focus position (e.g., lens position) for camera 200. Thus, depth imaging system 104 on device 100, as shown in FIG. 1, may allow the device to implement ToF autofocusing (ToF-AF) for camera 200 in addition to autofocus processes using the camera itself.

Figure 6:
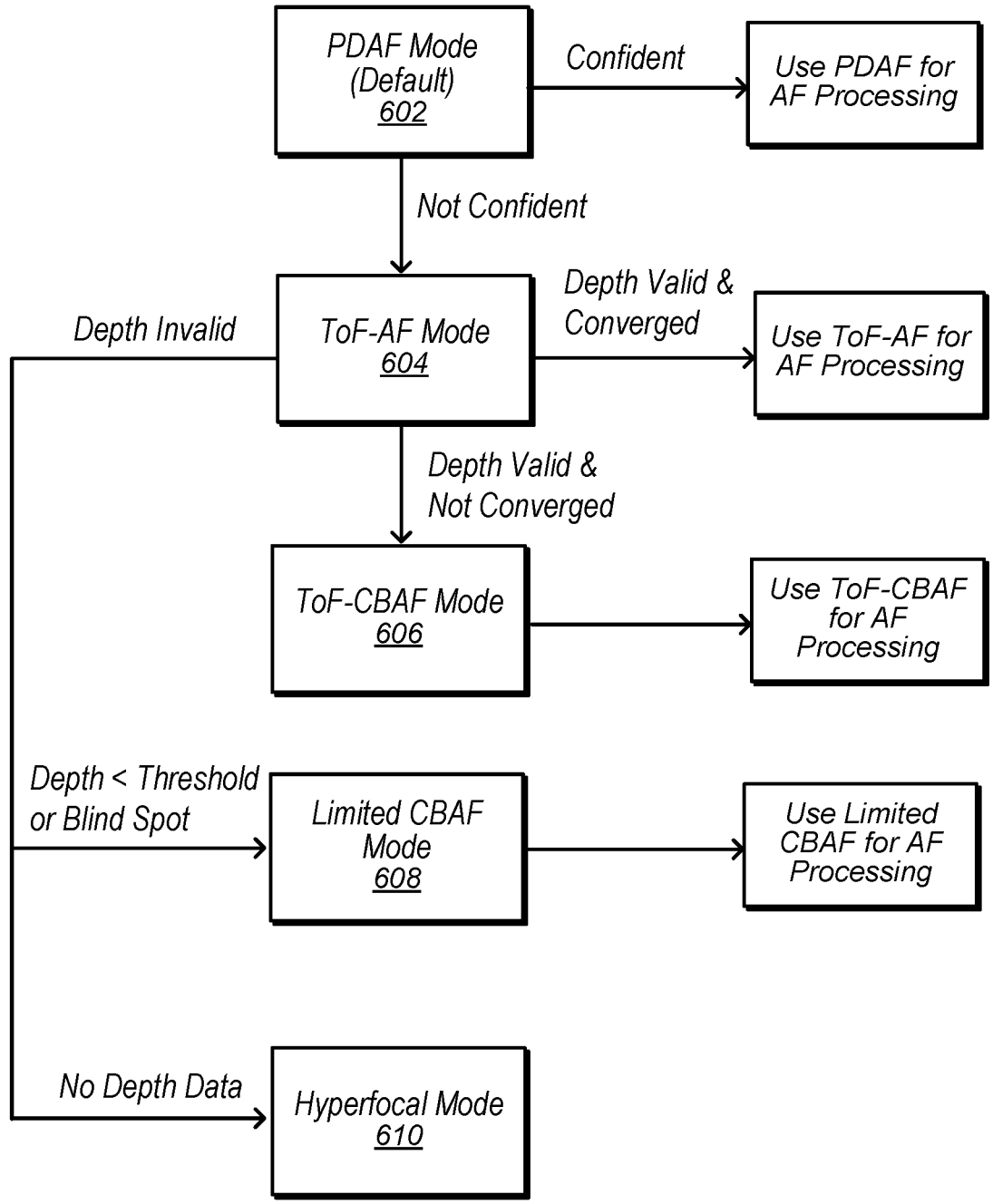
FIG. 6 depicts an overview representation of embodiments of autofocus processing for a camera on a device.

In certain embodiments, device 100 implements one of a plurality of autofocus techniques (e.g., PDAF, CBAF, ToF processing, etc.) for focusing camera 200 depending on the scene conditions and/or operating conditions of the camera. FIG. 6 depicts a flowchart representation of embodiments for hybrid autofocus processing of camera 200 on device 100. In certain embodiments, hybrid autofocus (AF) processing 600 is implemented on device 100. In various embodiments, hybrid AF processing 600 includes implementing PDAF mode 602, implementing ToF-AF mode 604 (e.g., processing using depth imaging system 104), implementing ToF-CBAF mode 606 (e.g., ToF-AF processing in combination with a restricted CBAF scan), implementing limited CBAF mode 608 (e.g., a limited range CBAF scan), or implementing a hyperfocal mode 610 (e.g., setting the position for the lens at hyperfocal).

In PDAF mode 602, PDAF is implemented to determine focus settings for camera 200 and provide autofocusing for the camera. PDAF may be implemented using camera 200 (e.g., through the camera and its associated circuitry). In some embodiments, PDAF is a default mode operated by device 100 for autofocusing of camera 200 in most scenarios. For example, PDAF may be implemented in normal light conditions and bright light conditions as PDAF provides fast autofocusing with low resource utilization on device 100.

As described herein, in some conditions (e.g., low light conditions or when a scene includes flat texture subject), the accuracy and/or reliability of PDAF in providing autofocus for camera 200 may be limited. In such embodiments, it may be desirable to implement another AF processing technique to determine autofocus for camera 200. In some embodiments, another AF processing technique is implemented when light levels being captured by camera 200 fall below a threshold. For example, when measured illuminance values (measure in lux) of the subject fall below a predetermined illuminance threshold, PDAF may be considered to be "not confident" in determining autofocus and another AF processing technique may be implemented.

In some embodiments, another AF processing technique is implemented when PDAF mode 602 returns a defocused result. For example, when PDAF is not confident in determining a focus position for camera 200 (such as when PDAF cannot determine the focus position with confidence above a predetermined level). In some embodiments, analysis of an image captured by camera 200 is used to determine whether PDAF is confident in determining a focus position for the camera. For example, analysis of focus or light conditions in the image may be used to determine the confidence of PDAF in providing autofocusing for camera 200.

In certain embodiments, ToF-AF, CBAF, or combinations thereof may be implemented to provide autofocus processing for camera 200 when PDAF is not confident. ToF-AF, CBAF, or combinations thereof are implemented in ToF-AF mode 604, ToF-CBAF mode 606, limited CBAF mode 608, and hyperfocal mode 610. In some embodiments, a determination of whether to implement ToF-AF mode 604, ToF-CBAF mode 606, limited CBAF mode 608, or hyperfocal mode 610 is made based on properties determined by depth imaging system 104 in association with ToF-AF.

In ToF-AF mode 604, ToF-AF processing (using depth imaging system 104) is directly implemented to provide autofocusing for camera 200. For example, depth imaging system 104 may determine a depth of a subject and the depth is translated to a focus position for camera 200 using a depth-to-position model, as described herein. In ToF-CBAF mode 606, ToF-AF processing (using depth imaging system 104) information is used to set a starting point and range for scanning using CBAF (e.g., a restricted CBAF scan).

In certain embodiments, a determination of whether to implement ToF-AF mode 604 or ToF-CBAF mode 606 is made based on a convergence in ToF-AF processing (e.g., convergence of depth-to-position model 704, as described herein). In some embodiments, the convergence in ToF-AF processing is related to an offset between focus position determined by ToF-AF processing and focus position determined by PDAF (when PDAF is confident). When ToF-AF processing is converged (e.g., the offset is below a predetermined threshold), ToF-AF mode 604 may be implemented to determine the focus position for focus directly based on the depth determined using depth imaging system 104.

When ToF-AF processing is not converged (e.g., the offset is above the predetermined threshold), ToF-CBAF mode 606 may be implemented with a focus position for focus determined by a CBAF scan where the scan is a limited (restricted) range scan. A restricted CBAF scan uses the focus position (e.g., lens position) from ToF-AF processing as a starting point for the scan. For example, the CBAF scan may scan up/down a limited amount (e.g., a few microns) from a starting focus position determined by ToF-AF processing. The restricted CBAF scan allows for compensation in the error (e.g., offset) in the ToF-AF processing determined focus position. Reducing the scan range of CBAF increases the accuracy and speed of the CBAF processing to determine the focus position for focusing camera 200. In some embodiments, a final focus position at the end of the restricted scan may be used to update the offset (e.g., ΔPFL described herein) and speed up the convergence of depth-to-position model 704.

Figure 7:
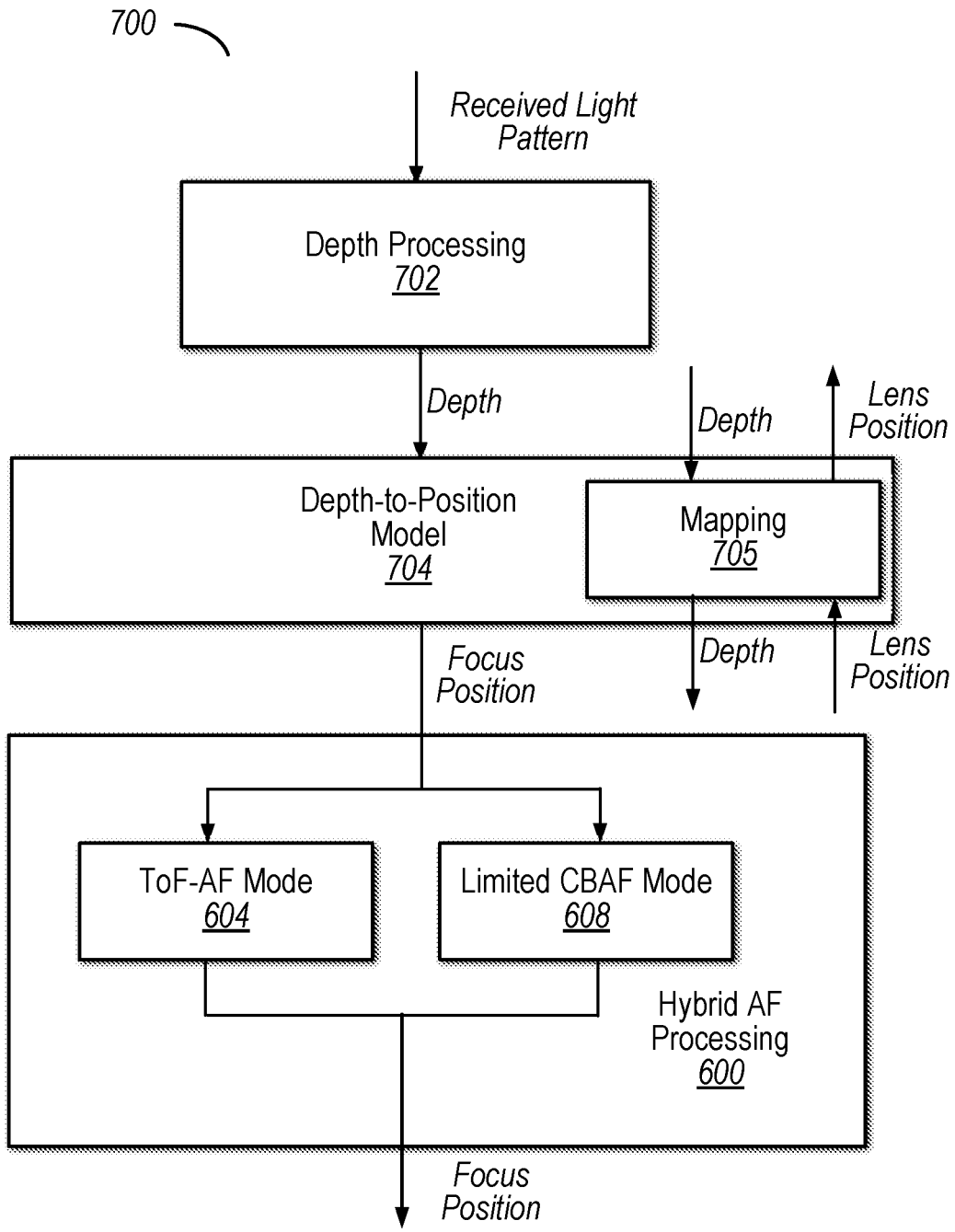
FIG. 7 depicts a flowchart representation of an embodiment implementing ToF-AF processing on a device.

In either ToF-AF mode 604 or ToF-CBAF mode 606, ToF-AF processing is implemented to determine a focus position (either as the focus position (e.g., lens position) for the camera or a starting point for a CBAF scan, as described above). FIG. 7 depicts a flowchart representation of an embodiment implementing ToF-AF processing (via depth imaging system 104) on device 100. In certain embodiments, as shown in FIG. 7, ToF-AF processing 700 includes a received light pattern being provided to depth processing 702. The received light pattern may be a light pattern received by depth imaging system 104 such as pattern 400, shown in FIG. 4.

In depth processing 702, the received light pattern is processed to determine a depth of a subject (or subjects) in a region of interest (ROI) in the field of view of camera 200. In certain embodiments, camera 200 is attempting to autofocus on a subject in a ROI within the field of view of a particular lens of camera 200. For example, camera 200 may be attempting to autofocus on a subject in a ROI within the field of view of a wide lens, a telephoto lens, or another lens on the camera. ROIs may be selected within the field of view of a particular lens using various methods. Examples of methods for selecting ROIs include, but are not limited to, default ROI detection (e.g., ROI determined based on standard parameters in the field of view), tap-to-focus (TTF) ROI selection (e.g., the user taps a display of the field of view and an ROI is placed around the tapped point), and face detection ROI selection (e.g., an ROI is placed around a face detected by a face detection process in the field of view).

To begin depth processing in 702, the received light pattern may be projected on a field of view of a lens on camera 200. In various embodiments, one of the cameras 200 on device 100 does not provide any autofocus capabilities. For example, the camera with the super wide lens field of view may not have autofocus capability and the super wide lens in the camera may be fixed-focus and locked at a hyperfocal position. In such embodiments, the received light pattern may be transformed onto the camera without autofocus capability (e.g., a super wide camera view). FIG. 8 depicts a representation of an embodiment of the received light pattern projected on a super wide lens field of view. In the illustrated embodiment, the received light pattern is pattern 400 from the embodiment shown in FIG. 4. Pattern 400 is projected on super wide lens field of view 800.

To utilize pattern 400 based on a particular ROI for a particular lens, the ROIs from the particular lens may be projected onto the super wide lens view. FIG. 9 depicts a representation of embodiments of ROIs from a wide lens field of view. ROI 900 is, for example, a default ROI from the wide lens field of view. ROI 902 is, for example, a face detection or TTF ROI from the wide lens field of view. FIG. 10 depicts a representation of embodiments of ROIs from a telephoto lens field of view. ROI 1000 is, for example, a default ROI from the telephoto lens field of view. ROI 1002 is, for example, a face detection or TTF ROI from the telephoto lens field of view.

The ROIs from the wide lens view or the telephoto lens view may be scaled and projected onto super wide lens field of view 800 to overlay with pattern 400, as shown in FIG. 8. Thus, FIG. 8 depicts how the fields of view of different ROIs and how they overlap. It is to be noted while FIG. 8 depicts multiple relevant ROIs projected onto super wide lens field of view 800, during operational embodiments, typically only the ROI of interest for autofocusing is projected (e.g., selected for projection) onto the super wide lens field of view to overlay with pattern 400. For example, only the ROI of interest of the camera being autofocused (such as either the wide angle lens camera or the telephoto lens camera) is projected onto the super wide lens field of view.

Figure 10A:
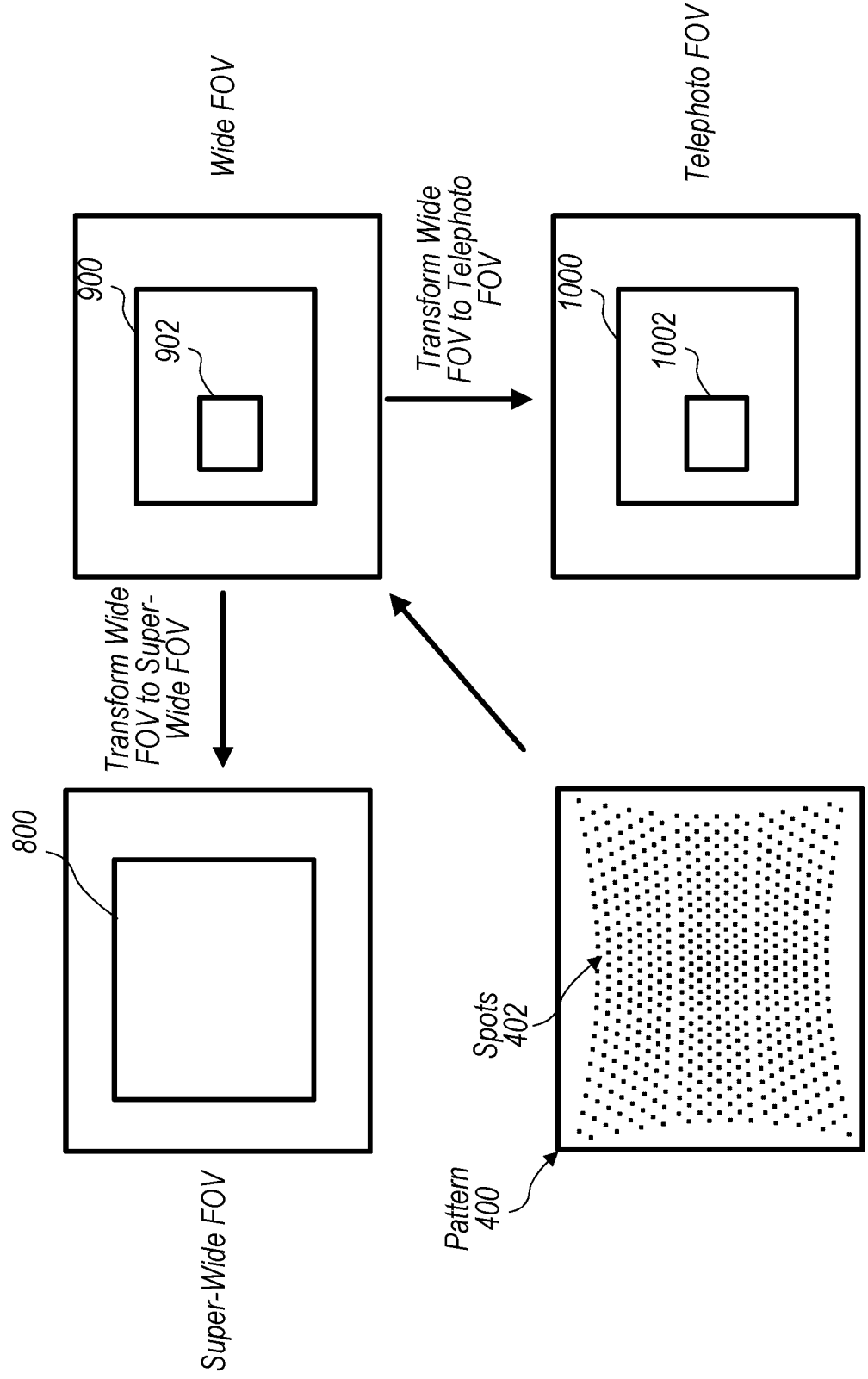
FIG. 10A depicts an example representation of an embodiment of a wide lens field of view camera being used as a base reference.

In some embodiments, each of the cameras on device 100 has autofocus capabilities. For example, the camera with the super wide lens field of view has autofocus capability along with the wide lens field of view camera and the telephoto lens field of view camera. In such embodiments, the received light pattern may need to be transformed onto each camera lens field of view individually. In some embodiments, one of the cameras field of views may be implemented as a base reference for the transformation and the light pattern can then be directly transformed to the fields of view for the other cameras. FIG. 10A depicts an example representation of an embodiment of the wide lens field of view camera being used as the base reference. In the illustrated embodiment, the received light pattern (pattern 400) is transformed to wide lens field of view 900 and then transformed to either super wide lens field of view 800 or telephoto lens field of view 1000 as needed.

In some embodiments, the ROI selected for autofocusing a camera may be an ROI associated with another camera. For example, a focus position for a primary camera may be determined from the focus position of a secondary camera determined using the ROI for the secondary camera. An example of a primary/secondary camera focus relationship is described in U.S. Pat. No. 10,429,608 to Baer et al. In some embodiments, the full depth map may be used as the ROI. With the selected ROI overlayed with pattern 400 (e.g., the received light pattern) in super wide lens field of view 800, spots 402 within the ROI may be determined. Spots 402 within the selected ROI may be utilized for determining depth within the ROI (e.g., depth of a subject within the ROI).

Figure 11:
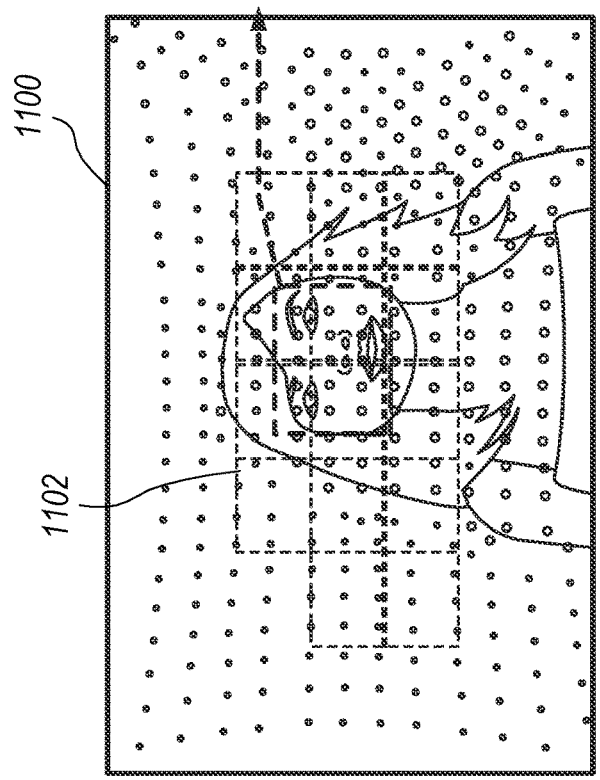
FIG. 11 depicts a representation of an embodiment of a received light pattern overlayed on an image of a face.

FIG. 11 depicts a representation of an embodiment of a received light pattern overlayed on an image of a face. In image 1100, spots 402 in pattern 400 are overlayed on ROI 1102. After spots 402 are overlayed on ROI 1102, spots with high confidence and high SNR in the ROI may be determined (e.g., spots with confidence and SNR above selected levels). In the illustrated embodiment, spot size is scaled based on confidence and SNR for simplicity. Once high confidence and high SNR spots 402 within ROI 1102 are determined, these spots may be assessed using histogram analysis (e.g., distribution function analysis).

Figure 12:
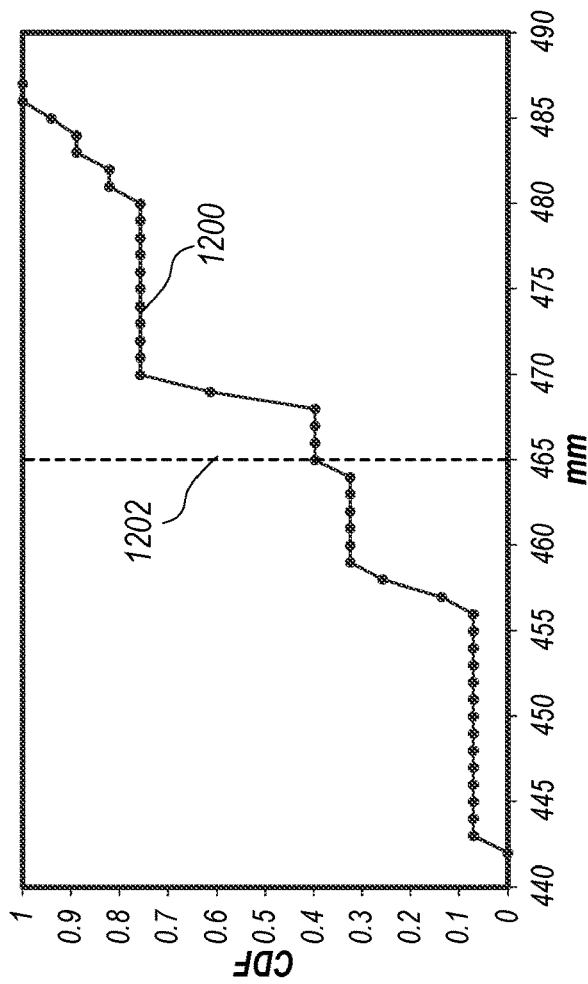
FIG. 12 depicts an example histogram for spots in an ROI.

FIG. 12 depicts an example histogram for spots 402 in ROI 1102. Spots 402 may be weighted using their SNR values in the histogram. In the example of FIG. 12, the cumulative distribution function (CDF) 1200 of spots 402 is plotted versus depth. In one embodiment, from analysis of the histogram, a depth may be determined as about 465 mm based on the 33⅓ percentile in the histogram (as shown by vertical line 1202). Thus, by overlaying spots 402 on ROI 1102, analysis of the spots may be used to determine a depth of a subject in the ROI.

There may be instances in which it is possible that no spot information is found within an ROI (e.g., no spots are identified within the ROI). In such embodiments, the ROI scene may be assumed to be at infinity. In some embodiments, if the ROI is a TTF-selected ROI when there is no spot information within an ROI, a CBAF scan may be initiated since the TTF-selected ROI is a user selected ROI.

There are also possible embodiments where there are spots within an ROI but there are no high confidence spots within the ROI. In such embodiments, the ROI may be expanded or enlarged to attempt to find high confidence spots for determining depth. For example, the ROI may be expanded into multiple ROIs of larger size. Spots within the multiple ROIs of larger size may then be assessed using down selection or advanced (adaptive) analysis to determine a depth of a subject in the multiple ROIs.

In some embodiments, it may be possible to utilize information from an RGB camera capture of a scene to augment the resolution of depth determination from pattern 400 and spots 402. For example, a neural network model may be implemented to get a depth map from pattern 400 and spots 402 and merge information from the RGB camera capture to determine depth of a subject in an ROI.

Returning to FIG. 7, the depth determined by depth processing 700 (e.g., "target depth") may be provided to depth-to-position model 704. Depth-to-position model 704 may determine a focus position for camera 200 based on the received depth. In some embodiments, depth-to-position model 704 is part of an autofocus position system on camera 200. Depth-to-position model 704 may include mapping 705 that maps between depth (e.g., the subject distance) and lens position (or focus position) in camera 200. Mapping 705 may be provided from depth to lens (focus) position or vice versa by depth-to-position model 704.

In certain embodiments, depth-to-position model 704 maps depth to lens position using one or more thin lens equations. For example, a thin lens equation may be used to determine a practical focal length (PFL) of the lens from the depth (e.g., an ideal PFL, as described herein). A final position (e.g., target PFL) for focus may be determined from the PFL determined from the thin lens equation. Variable parameters of camera 200 may also be implemented in depth-to-position model 704. For example, temperature corrections or corrections for other camera properties may be implemented in depth-to-position model 704.

As shown in FIG. 7, the focus position (e.g., lens position) may be provided to hybrid AF processing 600. The focus position is then provided to either ToF-AF mode 604 or ToF-CBAF mode 606 based on whether depth-to-position model 704 is converged or not. As described above, in ToF-AF mode 604, the focus position is determined directly from the focus position determined by depth-to-position model 704. Alternatively, in ToF-CBAF mode 606, the focus position is determined by a restricted CBAF scan that uses the focus position determined by depth-to-position model 704 as a starting point for the scan.

Figure 13:
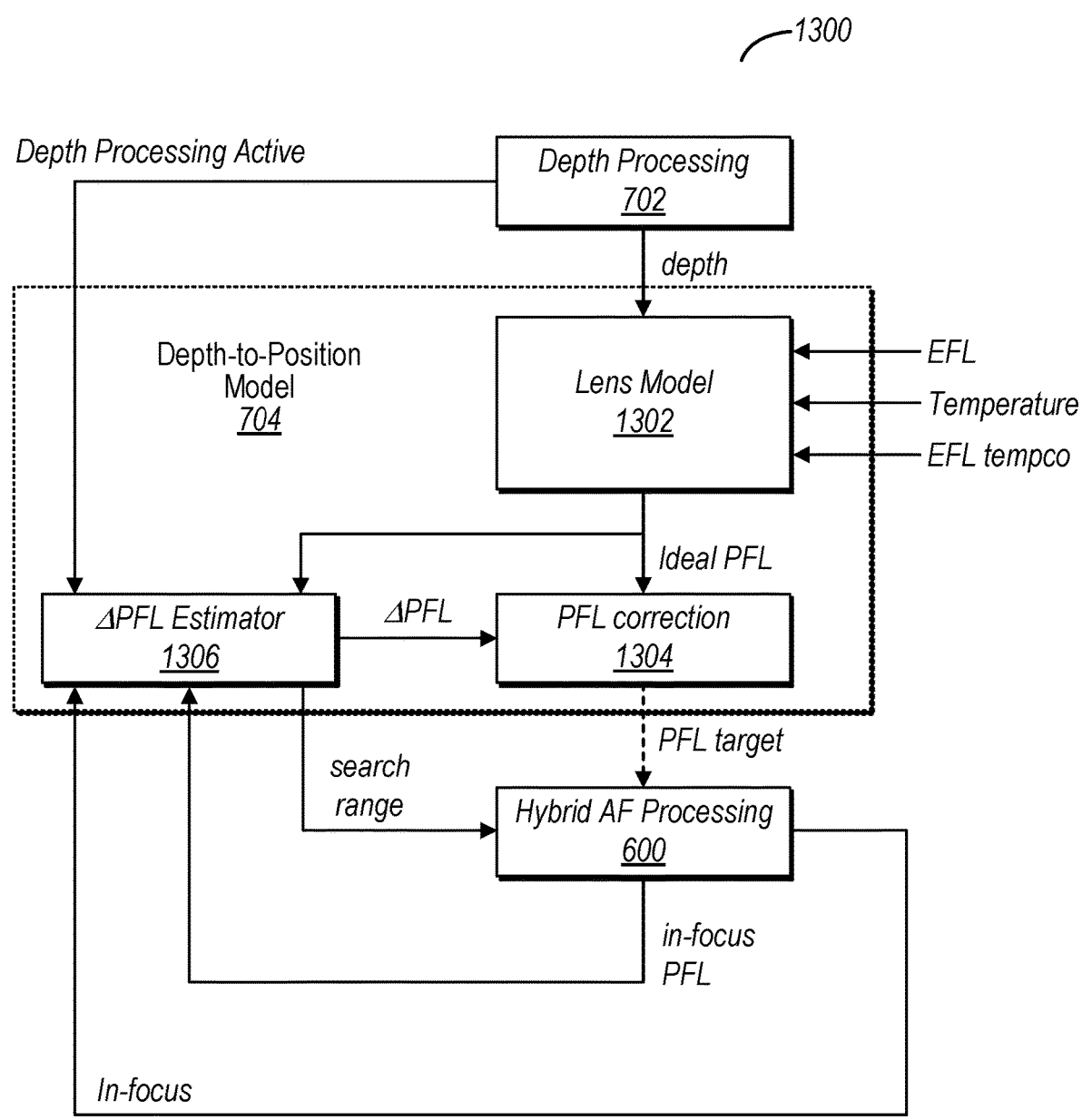
FIG. 13 depicts a flowchart representation of an embodiment of an adaptive estimator process implemented for a depth-to-position model.

In certain embodiments, convergence of depth-to-position model 704 is determined by an adaptive estimator process implemented for the depth-to-position model. FIG. 13 depicts a flowchart representation of an embodiment of adaptive estimator process 1300 implemented for depth-to-position model 704. In certain embodiments, depth-to-position model 704 includes lens model 1302, PFL correction 1304, ΔPFL estimator 1306. In process 1300, lens model 1302 receives depth information from depth processing 702. Lens model 1302 may determine an ideal PFL based on the depth. In certain embodiments, the ideal PFL is determined using a thin lens equation. For example, mapping 705, described above, may be used to determine the ideal PFL from the depth. Parameters such as effective focal length (EFL), temperature, and EFL temperature coefficient may also be factored in the determination of the ideal PFL by lens model 1302. In some embodiments, lens model 1302 is a function of an autofocus mechanism (described above) implemented in camera 200.

In the illustrated embodiment, ideal PFL is provided to PFL correction 1304. In certain embodiments, PFL correction 1304 applies ΔPFL from ΔPFL estimator 1306 to the ideal PFL to determine the PFL target. ΔPFL may be determined by one or more models implement in ΔPFL estimator 1306. The PFL target may correspond to focus position implemented in hybrid AF processing 600 (e.g., focus position from ToF-AF processing, as shown in FIG. 7). ΔPFL is an offset correction to the ideal PFL to provide more accurate mapping of depth to focus position.

ΔPFL estimator 1306 may determine and update ΔPFL during operation of camera 200. In certain embodiments, ΔPFL estimator 1306 determines and updates ΔPFL based on information received from PDAF processing when PDAF processing is active and confident in determining focus position of lens 106 in camera 200 (e.g., during PDAF mode 602). As shown in FIG. 13, ΔPFL estimator 1306 may receive an indication that depth processing 702 (e.g., ToF-AF processing) is active on device 100. ΔPFL estimator 1306 may operate when depth processing 702 is active. ΔPFL estimator 1306 may further receive an indication from hybrid AF processing 600 that camera 200 is in focus ("in-focus") during PDAF processing along with the PFL corresponding to the in focus position ("in-focus PFL") determined by the PDAF processing. ΔPFL estimator 1306 may use the input data to determine whether a training process to update ΔPFL using the PFL information from PDAF processing is needed.

Figure 14:
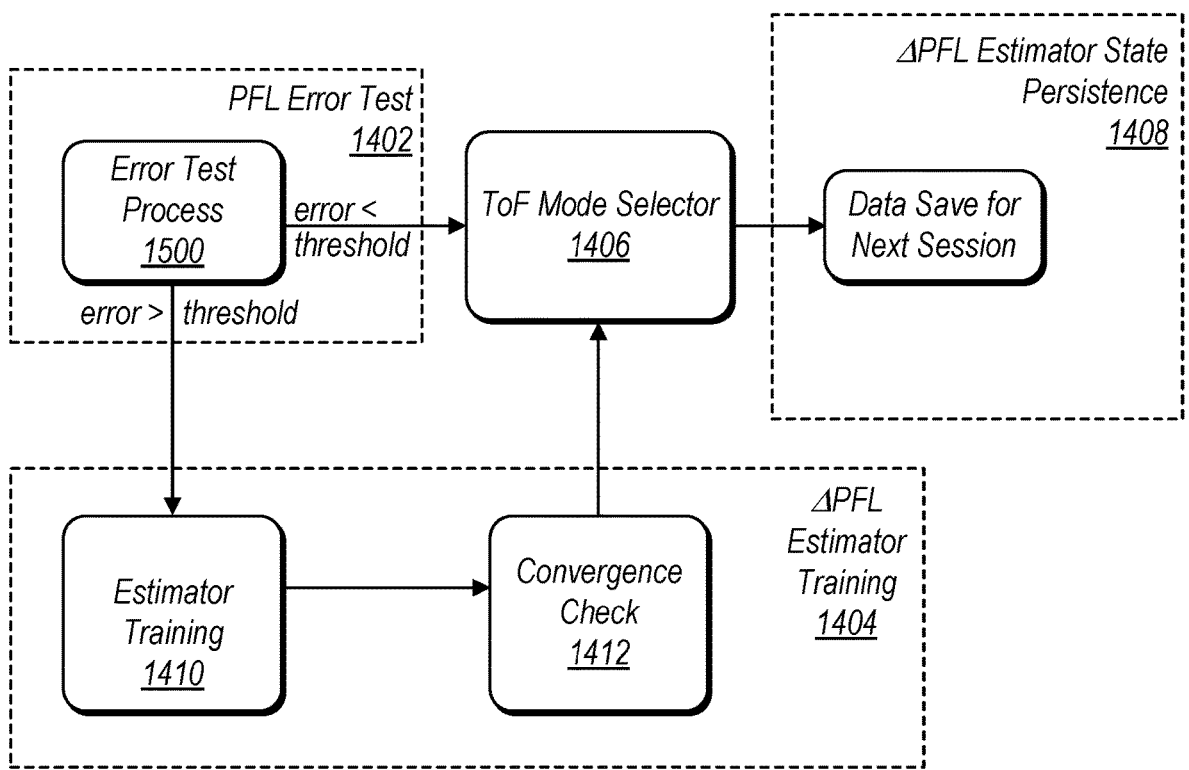
FIG. 14 depicts a flowchart representation of an embodiment of an adapting process implemented for a ΔPFL estimator.

FIG. 14 depicts a flowchart representation of an embodiment of adapting process 1400 implemented for ΔPFL estimator 1306. In the illustrated embodiment, process 1400 includes PFL error test 1402, ΔPFL estimator training 1404, ToF mode selector 1406, and ΔPFL estimator state persistence 1408. In PFL error test 1402, a determination is made whether ΔPFL estimator 1306 (and, correspondingly, depth-to-position model 704) is converged. In certain embodiments, the determination whether ΔPFL estimator 1306 is converged is based on an assessment of the accuracy of ΔPFL in providing the correction to the ideal PFL in PFL correction 1304. Assessing the accuracy may include, for example, determining an error between the PFL determined by ToF-AF processing (e.g., PFL target) and the PFL determined by PDAF processing. If the error is below a predetermined threshold, then ΔPFL estimator 1306 is converged and process 1400 continues to ToF mode selector 1406. If the error is above the predetermined threshold, then ΔPFL estimator 1306 is not converged and process 1400 continues with ΔPFL estimator training 1404.

Figure 15:
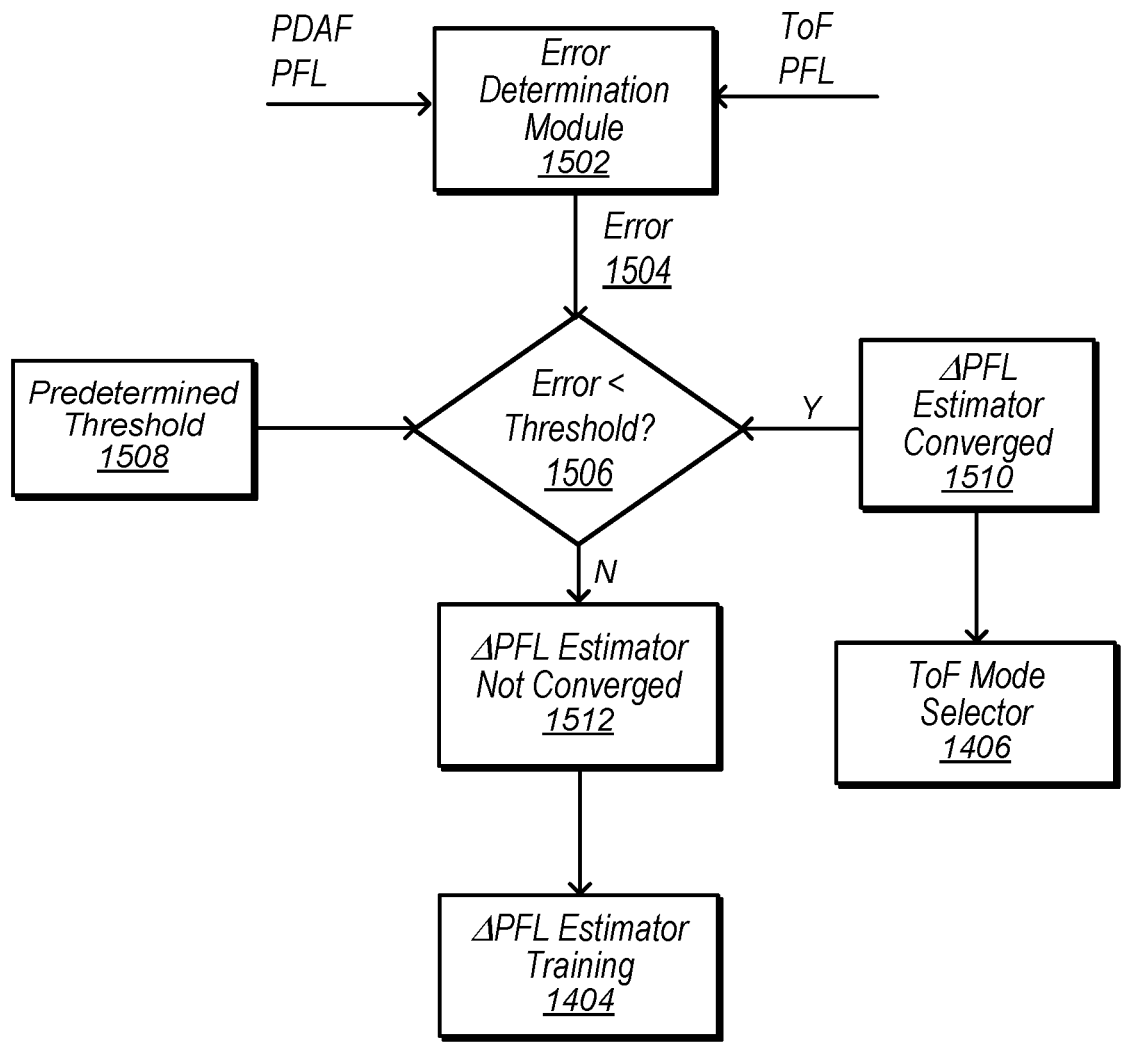
FIG. 15 depicts a flowchart representation of an embodiment of an error test process for a PFL error test.

FIG. 15 depicts a flowchart representation of an embodiment of error test process 1500 for PFL error test 1404. In process 1500, error determination module 1502 receives PDAF PFL data and ToF PFL data. In certain embodiments, the PFL data is received for a predetermined number of data points (e.g., a predetermined time period or finite number of data points). PDAF PFL data may include the in focus PFL data determined by PDAF processing when PDAF processing is active and confident, as described herein. ToF PFL data may include the PFL target data determined by depth-to-position model 704 (which may be determined by ΔPFL estimator 1306 by using ideal PFL data from lens model 1302 in combination with the current ΔPFL value).

Error determination module 1502 may output error 1504 determined for the predetermined number of data points where the error is the difference between PDAF PFL and ToF PFL. Error 1504 may be, for example, an average difference between PDAF PFL and ToF PFL over the predetermined number of data points. In some embodiments, error 1504 may be determined from depth data. For example, as shown in FIG. 7, lens position may be provided to mapping 705 to output depth. Thus, depth for an in focus PDAF PFL may be determined using mapping 705 while depth for ToF-AF processing is the output from depth processing 702. Comparison of the depth determined for PDAF to the depth from depth processing 702 may provide error 1504.

In 1506, error 1504 is compared to predetermined threshold 1508 to determine whether the error is below the predetermined threshold. If error 1504 is below predetermined threshold 1508, then ΔPFL estimator 1306 (and depth-to-position model 704) is converged in 1510 and ToF mode selector 1406 is implemented. If error 1504 is above predetermined threshold 1508, then ΔPFL estimator 1306 (and depth-to-position model 704) is not converged in 1512 and training for the ΔPFL estimator 1306 is implemented in 1404.

Returning to FIG. 14, in some embodiments, one or more validity checks may be performed before initiation of PFL error test 1402. For example, factors such as thermal equilibrium issues on camera 200, motion of device 100, light fluctuations, severe lighting conditions, or issues with PDAF processing (e.g., large defocus issues) may adversely affect the determination of PFL error. Thus, when these factors are outside certain ranges, initiation of PFL error test 1402 may be inhibited to prevent inaccuracy in calibration of ΔPFL estimator 1306 and ΔPFL.

In ΔPFL estimator training 1404, ΔPFL estimator 1306 is trained using PDAF PFL data to determine an accurate ΔPFL for depth-to-position model 704 based on the current state of camera 200. Determining an accurate ΔPFL for depth-to-position model 704 may enable ToF-AF processing (e.g., ToF-AF mode 604) to provide accurate and fast autofocusing on the scale of PDAF processing. In certain embodiments, as shown in FIG. 14, ΔPFL estimator training 1404 includes estimator training 1410 and check convergence 1412. In estimator training 1410, data from PDAF processing (when active and confident) is compared to data from depth processing 702 to determine an error between the data from PDAF processing and the data from depth processing 702. In some embodiments, the data from PDAF processing and the data from depth processing 702 used to determine the error includes PFL data (e.g., lens position data). In some embodiments, the data from PDAF processing and the data from depth processing 702 used to determine the error includes depth data (e.g., depth data from depth processing 702 and depth data estimated from focus position data determined by PDAF processing). Depth data may be estimated from focus position data by, for example, using mapping 705.

In certain embodiments, estimator training 1410 includes adjusting a model implemented in ΔPFL estimator 1306 to adjust ΔPFL and reduce the error between the data from PDAF processing and the data from depth processing 702. The model may be adjusted as data points are received by estimator training 1410. Estimator training 1410 may continue adjusting the model until the error between the data from PDAF processing and the data from depth processing 702 is reduced to below a predetermined threshold, as determined in check convergence 1412. In some embodiments, estimator training 1410 continues until ΔPFL (e.g., the offset) reaches a steady state value (e.g., changes in ΔPFL are below a predetermined shift threshold). When the error is reduced below the predetermined threshold and/or ΔPFL reaches a steady state value, ΔPFL estimator 1306 is determined to be converged in 1412 and process 1400 continues to ToF mode selector 1406.

In some embodiments, ΔPFL estimator training 1404 and error can be determined using data from depth processing and CBAF processing. This determination includes the use of full or restricted scan CBAF variants. In such embodiments, "in-focus" position is determined at the end of a CBAF scan, which is used to update depth-to-position model 704 similarly to the embodiments describing updating with PDAF processing.

In ToF mode selector 1406, the power mode of depth imaging system 104 may be reduced as ΔPFL estimator 1306 is converged. When ΔPFL estimator 1306 is converged, power may be reduced, for example, by reducing the frame rate of depth imaging system 104 (the rate that light patterns are provided and captured). When ΔPFL estimator 1306 is converged, the frame rate may be reduced as the ΔPFL estimator is not being actively trained and testing (e.g., monitoring using PFL error test 1402) can occur at a slower frame rate. The frame rate may be maintained at the slower frame rate until ΔPFL estimator training 1404 is activated again or depth imaging system 104 is activated to provide direct depth-to-position information in ToF-AF mode 604 (e.g., when PDAF processing is not confident). Providing the variable frame rate for depth imaging system 104 may conserve power on device 100 as depth imaging system 104 and ToF-AF processing may consume more power than other AF processing methods (e.g., PDAF or CBAF). In some embodiments, in ToF mode selector 1406, depth imaging system 104 may be turned off for short periods of time (e.g., on the order of seconds) to further reduce power consumption by the depth imaging system.

In certain embodiments, PFL error test 1402 is implemented at the beginning of each camera session. Conducting PFL error test 1402 at the beginning of each camera session allows ΔPFL estimator 1306 to determine whether there have been any changes in the system (either the camera itself or any circuitry associated with the camera) that have affected the correct value for ΔPFL. For example, changes in temperature, motion, power, and other factors may change the correct value for ΔPFL.

At the end of each camera session and when ΔPFL estimator 1306 is converged, ΔPFL estimator state persistence 1408 may be implemented. In ΔPFL estimator state persistence 1408, model data from the camera session (e.g., ΔPFL and other model data such as start/stop times of session, number of data points in session, etc.) is stored in device 100. The saved model data may then be used at the beginning of a subsequent camera session. For example, the saved ΔPFL may be used as a starting point for the next camera session. If ΔPFL saved from a previous session satisfies PFL error test 1402 (e.g., the error is below the predetermined threshold), then training of ΔPFL estimator 1306 is not needed in the session, which reduces power consumption and processor usage (e.g., by not having to increase the frame rate and reducing the amount of operations needed).

Figure 16:
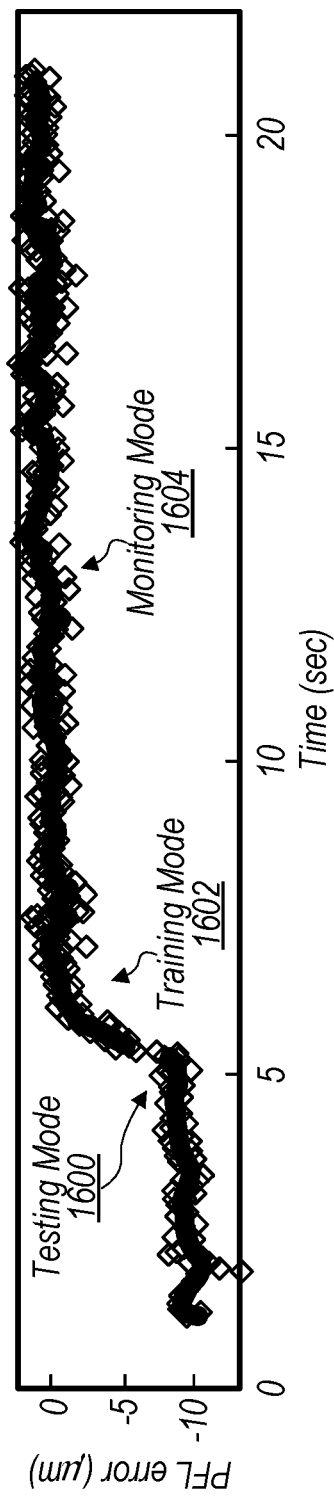
FIG. 16 depicts PFL error over time for an example.
Figure 17:
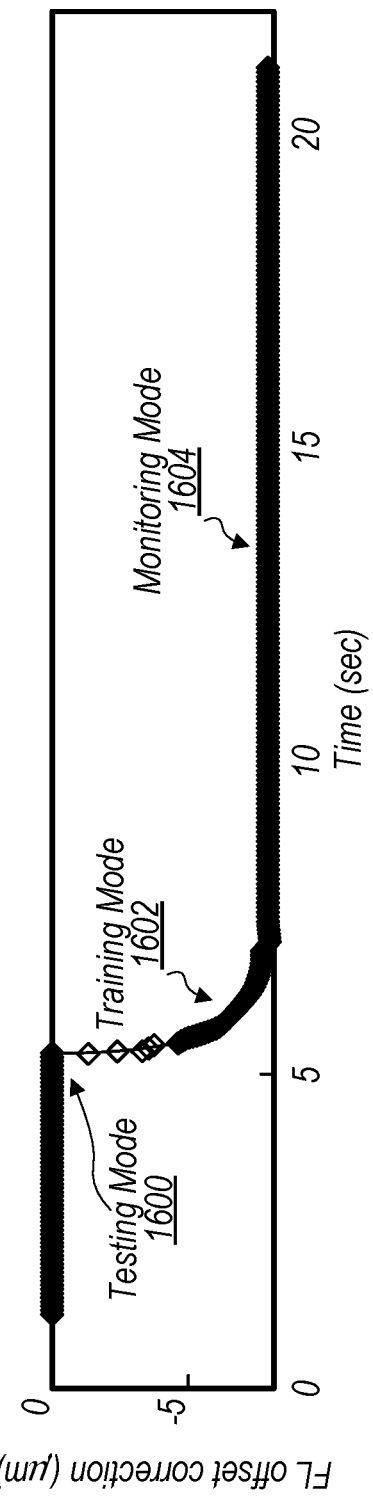
FIG. 17 depicts PFL offset correction (e.g., ΔPFL) over time for an example.

FIGS. 16 and 17 depict an example of data showing convergence of different variables associated with ΔPFL estimator 1306 during different modes (testing, training, and monitoring). FIG. 16 depicts PFL error (e.g., the error between the data from PDAF processing and the data from depth processing 702) over time for the example. FIG. 17 depicts PFL offset correction (e.g., ΔPFL) over time for the example. In the example, after the beginning of the session, ΔPFL estimator 1306 enters testing mode 1600. Testing mode 1600 may begin at some time after start of the session in the example. In the example, testing mode 1600 begins at around 5 seconds. In testing mode 1600, PFL error test 1402 operates over a number of data points until training mode 1602 is activated based on the PFL error test determining that the PFL error is above the predetermined threshold.

In training mode 1602, ΔPFL estimator 1306 is trained and the PFL error begins converging with the PFL error reducing towards zero, as shown in FIG. 16. At the same time, ΔPFL is increasing from zero during testing mode 1600 to higher offset values in training mode 1602, as shown in FIG. 17. Once the PFL error is reduced below the predetermined threshold and ΔPFL reaches steady state, ΔPFL estimator 1306 is in monitoring mode 1604. In monitoring mode 1604, the frame rate of depth imaging system 104 is reduced to save power (as described above). As shown in FIGS. 16 and 17, the change in PFL error is substantially equivalent in magnitude to the change in ΔPFL over the session.

Returning to FIG. 13, in certain embodiments, initial conditions for ΔPFL estimator 1306 are determined before any testing or updating of the ΔPFL estimator occurs (e.g., before any camera session begins). For example, initial conditions for PFL errors may be determined and programmed into device 100 during final assembly test and pack (FATP) of the device. The initial conditions may be stored in a memory of device 100 during FATP and retrieved after operation of the device and camera 200 is initiated.

In some embodiments, calibration data for one or more operations described herein are stored in device 100 during FATP. Calibration data may include data that is implemented, for example, by depth imaging system 104, lens model 1302, ΔPFL estimator 1306, or other models to provide more accurate autofocus processing. For example, thin lens equations, described herein, typically apply at the center of an image on axis only. Calibration data that includes peak focus position for PDAF relative to center position may be used in process 700 or process 1300 to adjust for off-center ROIs. As another example, calibration data may include field curvature data. Field curvature data may be used to adjust the target position when an ROI is off-center.

Returning to FIG. 6, as described herein, in ToF-AF mode 604, ToF-AF processing is implemented to provide direct autofocusing for camera 200 when ΔPFL estimator 1306 and depth-to-position model 704 are converged. During ToF-AF mode 604, depth imaging system 104 is operated at a high frame rate (e.g., on the order of the frame rate used for training ΔPFL estimator 1306). The high frame rate provides for fast determination of the focus position for lens 106 during a camera session. Once autofocus is determined in ToF-AF mode 604, the frame rate of depth imaging system 104 may be reduced (e.g., to a frame rate on the order of the frame rate used during monitoring of ΔPFL estimator 1306). Once the camera session ends (e.g., when one or more images are captured by camera 200), depth imaging system 104 may stay the reduced frame rate or be turned off.

In ToF-CBAF mode 606, as described herein, focus position information from ToF-AF processing is used to set a starting point and a range for a restricted scan using CBAF. ToF-CBAF mode 606 may be is implemented when ΔPFL estimator 1306 and depth-to-position model 704 are not converged. In some embodiments, the starting point and range for the restricted scan are provided from ΔPFL estimator 1306 (e.g., as "search range", shown in FIG. 13). The restricted scan may be a bi-directional scan around the starting point set by the range.

In certain embodiments, ToF-AF mode 604 or ToF-CBAF mode 606 are only implemented when a depth determined by depth imaging system 104 is valid (e.g., there is a high confidence in the accuracy of the depth determination by the depth imaging system such as when high confidence spots are in the ROI). Thus, in such embodiments, ToF-AF mode 604 is implemented when ΔPFL estimator 1306 and depth-to-position model 704 are converged and the depth is determined with high confidence while ToF-CBAF mode 606 is implemented when ΔPFL estimator 1306 and depth-to-position model 704 are not converged and the depth is determined with high confidence. In embodiments where the depth determined by depth imaging system 104 is not confident, hybrid AF processing 600 may implement limited CBAF mode 608 or hyperfocal mode 610.

In some embodiments, limited CBAF mode 608 is implemented when average spot intensity in depth imaging system 104 is below a predetermined threshold. The predetermined threshold for average spot intensity may be, for example, a threshold that determines low confidence in the depth determination. In such embodiments, depth imaging system 104 may provide an estimated depth but the depth is not sufficiently accurate to provide direct autofocusing using the depth or a restricted scan using the depth. Thus, a limited range CBAF scan may be implemented. In the limited range CBAF scan, the CBAF scan operates in a range around the low confidence depth estimation. The range of the limited range CBAF scan may, however, be higher than the range of a restricted CBAF scan due to the uncertainty in the depth estimation.

In some embodiments, limited CBAF mode 608 is implemented when a blind spot indication is determined by depth imaging system 104. A blind spot indication may be determined, for example, when camera 200 is attempting to capture an image of a subject through a window. In some embodiments, a determination on whether a blind spot is present is initiated in response to receiving reflective surface spots in a light pattern received by depth imaging system 104. For example, the determination on whether a blind spot is present may be initiated when a number of reflective surface spots is above a predetermined threshold or an intensity of reflective surface spots is above a predetermined threshold.

Figure 18:
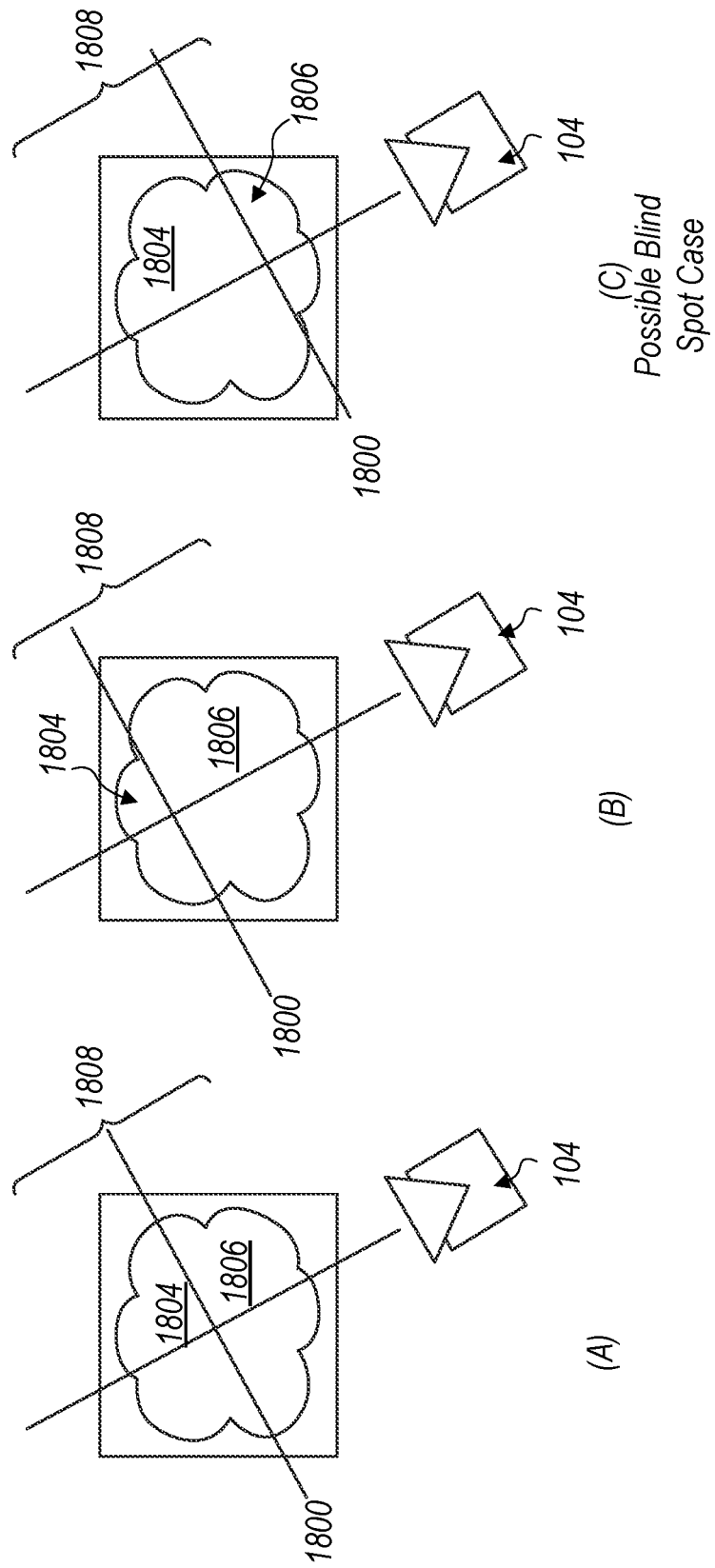
FIG. 18 depicts a representation of an embodiment of a determination of blind spot presence.

FIG. 18 depicts a representation of an embodiment of a determination of blind spot presence. For blind spot determination, plane 1800 is fit to point cloud 1802 (e.g., the light pattern) received by depth imaging system 104. With plane 1800 fit, depth behind the plane 1804 and depth in front of the plane 1806 are determined. The combination of depth behind the plane 1804 and depth in front of the plane 1806 provides total depth 1808. To assess whether a blind spot is indicated, depth behind the plane 1804 is compared to total depth 1808. If the depth ratio is above a predetermined threshold (and the number of reflective surface spots is above a predetermined threshold, then a blind spot is indicated when both conditions are temporally stable (e.g., continue for a selected number of frames captured by depth imaging system 104).

In (A) in FIG. 18, a situation is shown where depth behind the plane 1804 and depth in front of the plane 1806 are substantially equal and there is no blind spot indication. In (B), a situation is shown where depth behind the plane 1804 compared to total depth 1808 is below the predetermined threshold and there is no blind spot indication. In (C), a situation is shown where depth behind the plane 1804 compared to total depth 1808 is above the predetermined threshold and there is a blind spot indication (assuming the condition is temporally stable).

When a blind spot is indicated, limited CBAF mode 608 is implemented and a CBAF scan is used for determining autofocus. A CBAF scan may be implemented to avoid focusing on the wrong subject in the field of view. In some embodiments, a limited range CBAF scan may be implemented when a blind spot is indicated. For example, the depth behind the plane (or the depth in front of the plane) may be used to set a limited range CBAF scan.

In some embodiments, limited CBAF mode 608 is implemented when a depth determined by depth imaging system 104 is below a predetermined depth threshold. At distances close to camera 200 (e.g., in the macro range, typically around 20 cm to 40 cm), depth imaging system 104 may determine that the depth is close to the camera but there may be inaccuracy in the specific depth determination such that ToF-AF processing is not suitable for use. Thus, the predetermined depth threshold may be the distance from the camera at which depth determination using depth imaging system 104 becomes uncertain (e.g., is out of range of the depth imaging system).

In some embodiments, the lens may be locked at hyperfocal when the depth determination falls below the predetermined depth threshold. Locking the lens at hyperfocal, however, provides an undesirable experience for the user as many objects will be out of focus. In such embodiments, the user may initiate a full CBAF scan by setting an ROI using TTF ROI selection. The full CBAF scan will, however, be slower than PDAF processing or ToF-AF processing.

As depth imaging system 104 does provide some data on the depth when the depth falls below the predetermined depth threshold, in some embodiments, a limited range CBAF scan may be implemented as long as some depth determination data is available below the predetermined depth threshold. In such embodiments, depth imaging system 104 acts as a proximity sensor (e.g., lets the system know a subject is within a certain range from device 100). Thus, a limited range CBAF scan may be implemented with the scan limited to the range below the predetermined depth threshold. Providing the limited range CBAF scan may provide a better user experience by allowing camera 200 to seamlessly transition from ToF-AF processing to limited range CBAF without locking the lens at hyperfocal. In some embodiments, at a very close depth (e.g., a depth below the predetermined depth threshold, typically around 10 cm to 20 cm), depth imaging system 104 may not provide any depth information. In such embodiments, the lens may be locked at hyperfocal and a full CBAF scan may be initiated when a TTF ROI is selected.

In some instances, depth imaging system 104 may be unable to provide any depth estimation. For example, there may not be enough high confidence spots or any spots for determining depth in the received light pattern. When depth imaging system 104 is unable to provide any depth estimation and none of the conditions for limited CBAF mode 608 are indicated, the lens may be locked at hyperfocal in hyperfocal mode 610, as shown in FIG. 6.

As described herein, information received from PDAF processing is used to update ΔPFL estimator 1306. Updating ΔPFL estimator 1306 using the PDAF processing information increases the accuracy of depth-to-position model 704 in determining a focus position (e.g., lens position) using ToF-AF processing (e.g., using depth data from depth imaging system 104 to provide autofocus for a lens). With the improved accuracy in ToF-AF processing, ToF-AF processing may provide performance (e.g., accuracy and speed) that is near the performance of PDAF processing. Thus, using ToF-AF processing as described herein may allow for autofocus performance on the scale of PDAF processing to be maintained in conditions where PDAF processing is not confident (such as in low light conditions or flat texture conditions).

Figure 19:
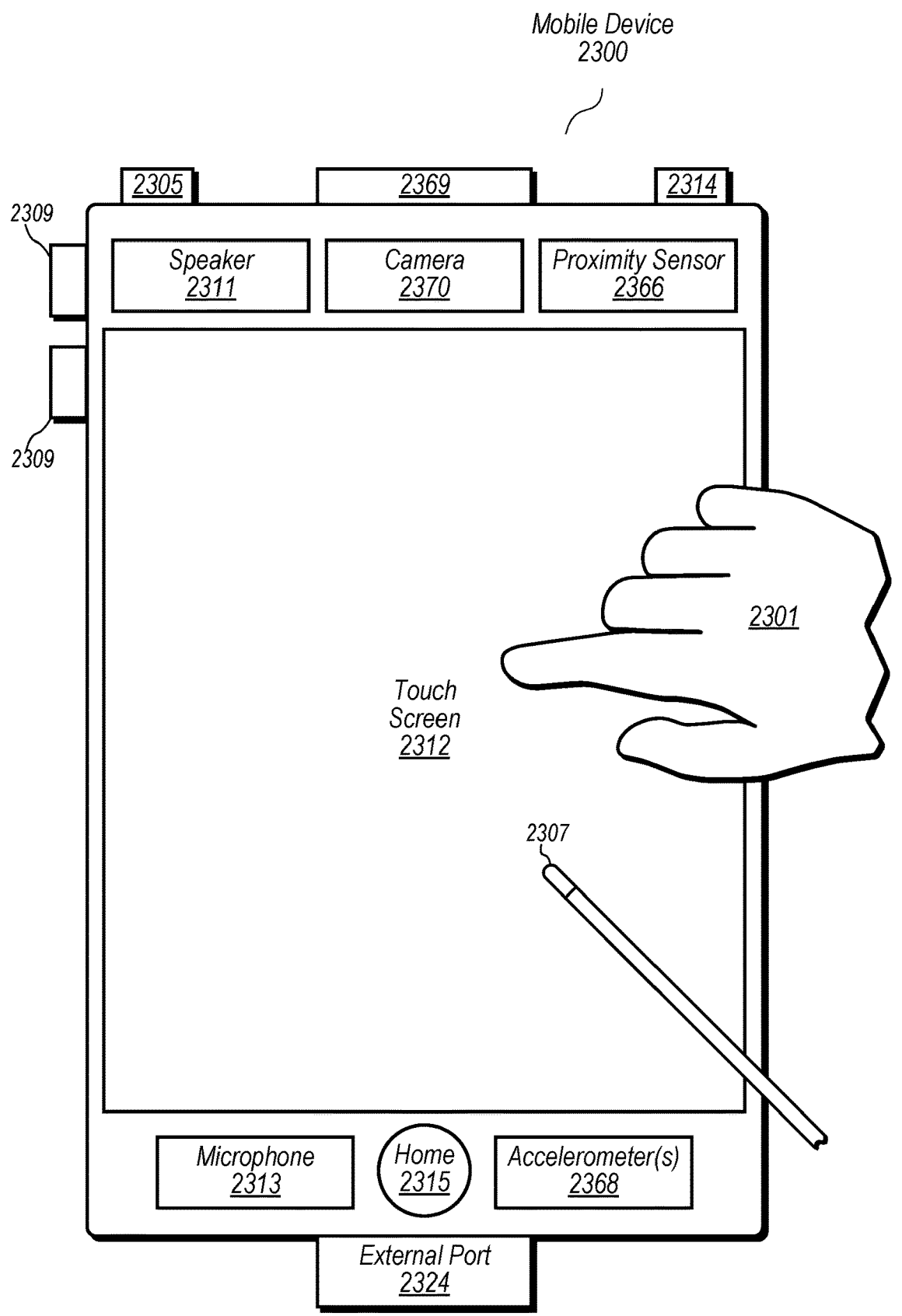
FIG. 19 illustrates a "front" side of a mobile device.
Figure 20:
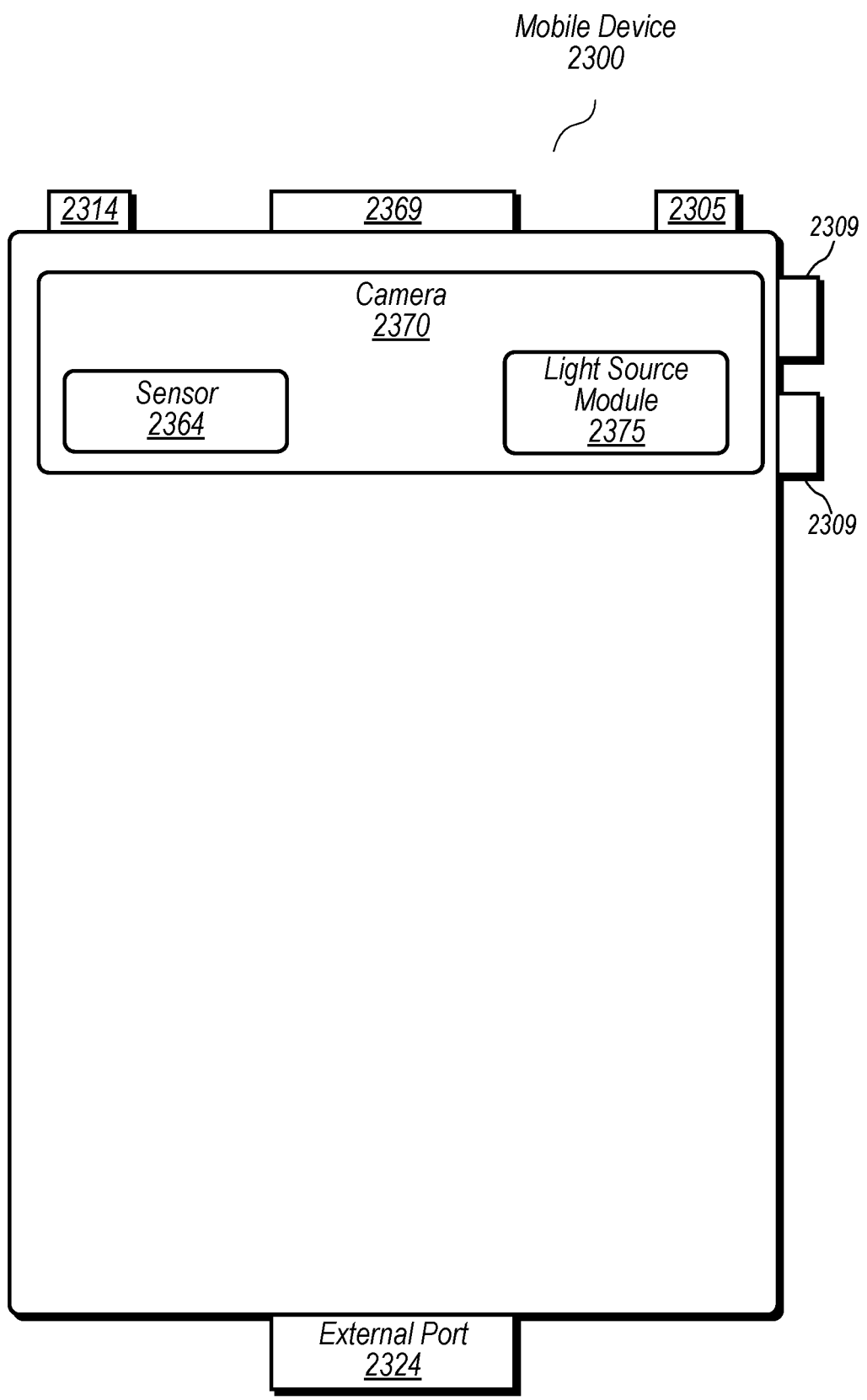
FIG. 20 illustrates a "rear" side of a mobile device.
Figure 21:
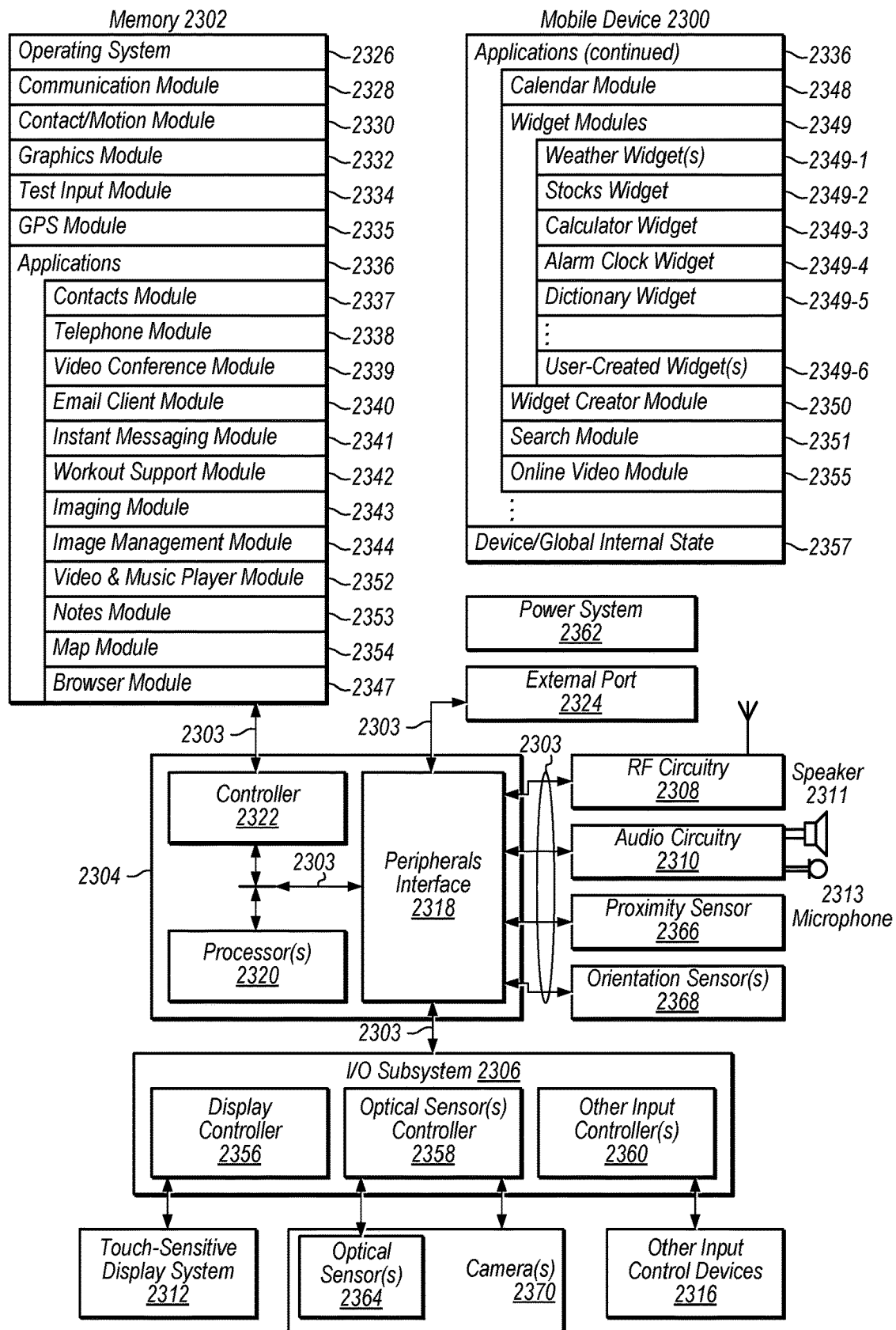
FIG. 21 illustrates a block diagram of a mobile device.

FIGS. 19-21 illustrate embodiments of mobile device 2300 that may include one or more cameras, in accordance with embodiments as described above. In some embodiments, device 2300 may include one or multiple features, components, and/or functionality of embodiments described herein.

FIG. 19 illustrates that a "front" side of device 2300 may have touch screen 2312. Touch screen 2312 may display one or more graphics within a user interface (UI). In this embodiment, as well as others described below, a user may select one or more of the graphics by making a gesture on the graphics, for example, with one or more fingers 2301 (not drawn to scale in the figure) or one or more styluses 2307 (not drawn to scale in the figure).

Device 2300 may also include one or more physical buttons, such as "home" or menu button 2315, which may be used to navigate to any application 2336 (see FIG. 21) in a set of applications that may be executed on device 2300. Alternatively, in some embodiments, the menu button is implemented as a soft key in a graphics user interface (GUI) displayed on touch screen 2312.

In one embodiment, device 2300 includes touch screen 2312, menu button 2315, push button 2305 for powering the device on/off and locking the device, volume adjustment button(s) 2309, Subscriber Identity Module (SIM) card slot 2369, head set jack 2314, and docking/charging external port 2324, in accordance with some embodiments. Push button 2305 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 2300 also may accept verbal input for activation or deactivation of some functions through microphone 2313.

FIG. 19 illustrates that the "front" side of device 2300 may include camera 2370, in accordance with some embodiments. FIG. 20 illustrates that a "rear" side of device 2300 may include camera 2370, in accordance with some embodiments. Camera 2370, which may be referred to as an "optical sensor" for convenience, may also be known as or called an optical sensor system. Camera 2370 may include one or more camera modules. FIG. 20 further illustrates camera 2370 includes optical sensor 2364 and light source module 2375. Light source module 2375 may include, for example, one or more internal strobes.

Referring to FIG. 21, a block diagram illustrates that device 2300 may include memory 2302 (which may include one or more computer readable storage mediums), memory controller 2322, one or more processing units (CPU's) 2320, peripherals interface 2318, RF circuitry 2308, audio circuitry 2310, speaker 2311, touch-sensitive display system 2312, microphone 2313, input/output (I/O) subsystem 2306, other input control devices 2316, and external port 2324. Device 2300 may include one or more optical sensors 2364. These components may communicate over one or more communication buses or signal lines 2303.

It should be appreciated that device 2300 is only one example of a portable multifunction device, and that device 2300 may have more or fewer components than shown, may combine two or more components, or may have a different configuration or arrangement of the components. The various components shown in FIG. 21 may be implemented in hardware, software, or a combination of hardware and software, including one or more signal processing and/or application specific integrated circuits.

Memory 2302 may include high-speed random access memory and may also include non-volatile memory, such as one or more magnetic disk storage devices, flash memory devices, or other non-volatile solid-state memory devices. Access to memory 2302 by other components of device 2300, such as CPU 2320 and the peripherals interface 2318, may be controlled by memory controller 2322.

Peripherals interface 2318 can be used to couple input and output peripherals of the device to CPU 2320 and memory 2302. The one or more processors 2320 run or execute various software programs and/or sets of instructions stored in memory 2302 to perform various functions for device 2300 and to process data.

In some embodiments, peripherals interface 2318, CPU 2320, and memory controller 2322 may be implemented on a single chip, such as chip 2304. In some other embodiments, they may be implemented on separate chips.

RF (radio frequency) circuitry 2308 receives and sends RF signals, also called electromagnetic signals. RF circuitry 2308 converts electrical signals to/from electromagnetic signals and communicates with communications networks and other communications devices via the electromagnetic signals. RF circuitry 2308 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 2308 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 2310, speaker 2311, and microphone 2313 provide an audio interface between a user and device 2300. Audio circuitry 2310 receives audio data from peripherals interface 2318, converts the audio data to an electrical signal, and transmits the electrical signal to speaker 2311. Speaker 2311 converts the electrical signal to human-audible sound waves. Audio circuitry 2310 also receives electrical signals converted by microphone 2313 from sound waves. Audio circuitry 2310 converts the electrical signal to audio data and transmits the audio data to peripherals interface 2318 for processing. Audio data may be retrieved from and/or transmitted to memory 2302 and/or RF circuitry 2308 by peripherals interface 2318. In some embodiments, audio circuitry 2310 also includes a headset jack (e.g., 2314, FIGS. 19-20). The headset jack provides an interface between audio circuitry 2310 and removable audio input/output peripherals, such as output-only headphones or a headset with both output (e.g., a headphone for one or both ears) and input (e.g., a microphone).

I/O subsystem 2306 couples input/output peripherals on device 2300, such as touch screen 2312 and other input control devices 2316, to peripherals interface 2318. I/O subsystem 2306 may include display controller 2356 and one or more input controllers 2360 for other input or control devices. The one or more input controllers 2316 receive/send electrical signals from/to other input or control devices 2316. The other input control devices 2316 may include physical buttons (e.g., push buttons, rocker buttons, etc.), dials, slider switches, joysticks, click wheels, and so forth. In some alternative embodiments, input controller(s) 2360 may be coupled to any (or none) of the following: a keyboard, infrared port, USB port, and a pointer device such as a mouse. The one or more buttons (e.g., 2309, FIGS. 19-20) may include an up/down button for volume control of speaker 2311 and/or microphone 2313. The one or more buttons may include a push button (e.g., 2306, FIGS. 19-20).

Touch-sensitive display 2312 provides an input interface and an output interface between the device and a user. Display controller 2356 receives and/or sends electrical signals from/to touch screen 2312. Touch screen 2312 displays visual output to the user. The visual output may include graphics, text, icons, video, and any combination thereof (collectively termed "graphics"). In some embodiments, some or all of the visual output may correspond to user-interface objects.

Touch screen 2312 has a touch-sensitive surface, sensor or set of sensors that accepts input from the user based on haptic and/or tactile contact. Touch screen 2312 and display controller 2356 (along with any associated modules and/or sets of instructions in memory 2302) detect contact (and any movement or breaking of the contact) on touch screen 2312 and converts the detected contact into interaction with user-interface objects (e.g., one or more soft keys, icons, web pages or images) that are displayed on touch screen 2312. In an example embodiment, a point of contact between touch screen 2312 and the user corresponds to a finger of the user.

Touch screen 2312 may use LCD (liquid crystal display) technology, LPD (light emitting polymer display) technology, or LED (light emitting diode) technology, although other display technologies may be used in other embodiments. Touch screen 2312 and display controller 2356 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 2312. In an example embodiment, projected mutual capacitance sensing technology may be used.

Touch screen 2312 may have a video resolution in excess of 100 dots per inch (dpi). In some embodiments, the touch screen has a video resolution of approximately 160 dpi. The user may make contact with touch screen 2312 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 2300 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 2312 or an extension of the touch-sensitive surface formed by the touch screen.

Device 2300 also includes power system 2362 for powering the various components. Power system 2362 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

As described herein, device 2300 may include one or more cameras 2370 that include optical sensors 2364. FIG. 21 shows optical sensor 2364 coupled to optical sensor controller 2358 in I/O subsystem 2306. Optical sensor 2364 may include charge-coupled device (CCD) or complementary metal-oxide semiconductor (CMOS) phototransistors. Optical sensor 2364 receives light from the environment, projected through one or more lens, and converts the light to data representing an image. In conjunction with camera(s) 2370 (such as an embodiment of a camera described herein), optical sensor 2364 may capture still images or video. In some embodiments, an optical sensor is located on the back of device 2300, opposite touch screen display 2312 on the front of the device, so that the touch screen display may be used as a viewfinder for still and/or video image acquisition. In some embodiments, another optical sensor is located on the front of the device so that the user's image may be obtained for processing on the device (e.g., facial recognition processing) or for videoconferencing while the user views the other videoconference participants on the touch screen display.

Device 2300 may also include one or more proximity sensors 2366. FIG. 21 shows proximity sensor 2366 coupled to peripherals interface 2318. Alternatively, proximity sensor 2366 may be coupled to input controller 2360 in I/O subsystem 2306. In some embodiments, the proximity sensor turns off and disables touch screen 2312 when the multifunction device is placed near the user's ear (e.g., when the user is making a phone call).

Device 2300 includes one or more orientation sensors 2368. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 2300. In some embodiments, the one or more orientation sensors include any combination of orientation/rotation sensors. FIG. 21 shows the one or more orientation sensors 2368 coupled to peripherals interface 2318. Alternatively, the one or more orientation sensors 2368 may be coupled to an input controller 2360 in I/O subsystem 2306. In some embodiments, information is displayed on the touch screen display in a portrait view or a landscape view based on an analysis of data received from the one or more orientation sensors.

In some embodiments, the software components stored in memory 2302 include operating system 2326, communication module (or set of instructions) 2328, instructions). Furthermore, in some embodiments, memory 2302 stores device/global internal state, including information obtained from the device's various sensors and input control devices 2316; and location information concerning the device's location and/or attitude.

Operating system 2326 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 2328 facilitates communication with other devices over one or more external ports 2324 and also includes various software components for handling data received by RF circuitry 2308 and/or external port 2324. External port 2324 (e.g., Universal Serial Bus (USB), FIREWIRE, etc.) is adapted for coupling directly to other devices, in accordance with some embodiments, or indirectly over a network (e.g., the Internet, wireless LAN, etc.).

Contact/motion module 2330 may detect contact with touch screen 2312 (in conjunction with display controller 2356) and other touch sensitive devices (e.g., a touchpad or physical click wheel). Contact/motion module 2330 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 2330 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 2330 and display controller 2356 detect contact on a touchpad.

Contact/motion module 2330 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 2332 includes various known software components for rendering and displaying graphics on touch screen 2312 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 2332 stores data representing graphics to be used. Each graphic may be assigned a corresponding code. Graphics module 2332 receives, from applications etc., one or more codes specifying graphics to be displayed along with, if necessary, coordinate data and other graphic property data, and then generates screen image data to output to display controller 2356.

Text input module 2334, which may be a component of graphics module 2332, provides soft keyboards for entering text in various applications (e.g., contacts 2337, e-mail 2340, IM 2341, browser 2347, and any other application that needs text input).

GPS module 2335 determines the location of the device and provides this information for use in various applications (e.g., to telephone 2338 for use in location-based dialing, to imaging module 2343 as picture/video metadata, and to applications that provide location-based services such as weather widgets, local yellow page widgets, and map/navigation widgets).

Applications 2336 may include the following modules (or sets of instructions), or a subset or superset thereof:

contacts module 2337 (sometimes called an address book or contact list);
telephone module 2338;
video conferencing module 2339;
e-mail client module 2340;
instant messaging (IM) module 2341;
workout support module 2342;
camera module 2343 for still and/or video images;
image management module 2344;
browser module 2347;
calendar module 2348;
widget modules 2349, which may include one or more of: weather widget 2349-1, stocks widget 2349-2, calculator widget 2349-3, alarm clock widget 2349-4, dictionary widget 2349-5, and other widgets obtained by the user, as well as user-created widgets 2349-6;
widget creator module 2350 for making user-created widgets 2349-6;
search module 2351;
video and music player module 2352, which may be made up of a video player
module and a music player module;
notes module 2353;
map module 2354; and/or
online video module 2355.

Examples of other applications 2336 that may be stored in memory 2302 include other word processing applications, other image editing applications, drawing applications, presentation applications, JAVA-enabled applications, encryption, digital rights management, voice recognition, and voice replication.

In conjunction with touch screen 2312, display controller 2356, contact module 2330, graphics module 2332, and text input module 2334, contacts module 2337 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 2338, video conference 2339, e-mail 2340, or IM 2341; and so forth.

In conjunction with RF circuitry 2308, audio circuitry 2310, speaker 2311, microphone 2313, touch screen 2312, display controller 2356, contact module 2330, graphics module 2332, and text input module 2334, telephone module 2338 may be used to enter a sequence of characters corresponding to a telephone number, access one or more telephone numbers in address book 2337, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 2308, audio circuitry 2310, speaker 2311, microphone 2313, touch screen 2312, display controller 2356, optical sensor 2364, optical sensor controller 2358, contact module 2330, graphics module 2332, text input module 2334, contact list 2337, and telephone module 2338, videoconferencing module 2339 includes executable instructions to initiate, conduct, and terminate a video conference between a user and one or more other participants in accordance with user instructions.

In conjunction with RF circuitry 2308, touch screen 2312, display controller 2356, contact module 2330, graphics module 2332, and text input module 2334, e-mail client module 2340 includes executable instructions to create, send, receive, and manage e-mail in response to user instructions. In conjunction with image management module 2344, e-mail client module 2340 makes it very easy to create and send e-mails with still or video images taken by imaging module 2343.

In conjunction with RF circuitry 2308, touch screen 2312, display controller 2356, contact module 2330, graphics module 2332, and text input module 2334, the instant messaging module 2341 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 2308, touch screen 2312, display controller 2356, contact module 2330, graphics module 2332, text input module 2334, GPS module 2335, map module 2354, and music player module 2346, workout support module 2342 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 2312, display controller 2356, optical sensor(s) 2364, camera(s) 2370, optical sensor controller 2358, light source module 2375 (see FIG. 20), contact module 2330, graphics module 2332, and image management module 2344, imaging module 2343 includes executable instructions to capture still images or video (including a video stream) and store them into memory 2302, modify characteristics of a still image or video, or delete a still image or video from memory 2302.

In conjunction with touch screen 2312, display controller 2356, optical sensor(s) 2364, camera(s) 2370, contact module 2330, graphics module 2332, text input module 2334, light source module 2375 (see FIG. 20), and imaging module 2343, image management module 2344 includes executable instructions to arrange, modify (e.g., edit), or otherwise manipulate, label, delete, present (e.g., in a digital slide show or album), and store still and/or video images.

In conjunction with RF circuitry 2308, touch screen 2312, display system controller 2356, contact module 2330, graphics module 2332, and text input module 2334, browser module 2347 includes executable instructions to browse the Internet in accordance with user instructions, including searching, linking to, receiving, and displaying web pages or portions thereof, as well as attachments and other files linked to web pages.

In conjunction with RF circuitry 2308, touch screen 2312, display system controller 2356, contact module 2330, graphics module 2332, text input module 2334, e-mail client module 2340, and browser module 2347, calendar module 2348 includes executable instructions to create, display, modify, and store calendars and data associated with calendars (e.g., calendar entries, to do lists, etc.) in accordance with user instructions.

In conjunction with RF circuitry 2308, touch screen 2312, display system controller 2356, contact module 2330, graphics module 2332, text input module 2334, and browser module 2347, widget modules 2349 are mini-applications that may be downloaded and used by a user (e.g., weather widget 2349-1, stocks widget 2349-2, calculator widget 2349-3, alarm clock widget 2349-4, and dictionary widget 2349-5) or created by the user (e.g., user-created widget 2349-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 2308, touch screen 2312, display system controller 2356, contact module 2330, graphics module 2332, text input module 2334, and browser module 2347, the widget creator module 2350 may be used by a user to create widgets (e.g., turning a user-specified portion of a web page into a widget).

In conjunction with touch screen 2312, display system controller 2356, contact module 2330, graphics module 2332, and text input module 2334, search module 2351 includes executable instructions to search for text, music, sound, image, video, and/or other files in memory 2302 that match one or more search criteria (e.g., one or more user-specified search terms) in accordance with user instructions.

In conjunction with touch screen 2312, display system controller 2356, contact module 2330, graphics module 2332, audio circuitry 2310, speaker 2311, RF circuitry 2308, and browser module 2347, video and music player module 2352 includes executable instructions that allow the user to download and play back recorded music and other sound files stored in one or more file formats, such as MP3 or AAC files, and executable instructions to display, present or otherwise play back videos (e.g., on touch screen 2312 or on an external, connected display via external port 2324). In some embodiments, device 2300 may include the functionality of an MP3 player.

In conjunction with touch screen 2312, display controller 2356, contact module 2330, graphics module 2332, and text input module 2334, notes module 2353 includes executable instructions to create and manage notes, to do lists, and the like in accordance with user instructions.

In conjunction with RF circuitry 2308, touch screen 2312, display system controller 2356, contact module 2330, graphics module 2332, text input module 2334, GPS module 2335, and browser module 2347, map module 2354 may be used to receive, display, modify, and store maps and data associated with maps (e.g., driving directions; data on stores and other points of interest at or near a particular location; and other location-based data) in accordance with user instructions.

In conjunction with touch screen 2312, display system controller 2356, contact module 2330, graphics module 2332, audio circuitry 2310, speaker 2311, RF circuitry 2308, text input module 2334, e-mail client module 2340, and browser module 2347, online video module 2355 includes instructions that allow the user to access, browse, receive (e.g., by streaming and/or download), play back (e.g., on the touch screen or on an external, connected display via external port 2324), send an e-mail with a link to a particular online video, and otherwise manage online videos in one or more file formats, such as H.264. In some embodiments, instant messaging module 2341, rather than e-mail client module 2340, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 2302 may store a subset of the modules and data structures identified above. Furthermore, memory 2302 may store additional modules and data structures not described above.

In some embodiments, device 2300 is a device where operation of a predefined set of functions on the device is performed exclusively through a touch screen and/or a touchpad. By using a touch screen and/or a touchpad as the primary input control device for operation of device 2300, the number of physical input control devices (such as push buttons, dials, and the like) on device 2300 may be reduced.

The predefined set of functions that may be performed exclusively through a touch screen and/or a touchpad include navigation between user interfaces. In some embodiments, the touchpad, when touched by the user, navigates device 2300 to a main, home, or root menu from any user interface that may be displayed on device 2300. In such embodiments, the touchpad may be referred to as a "menu button." In some other embodiments, the menu button may be a physical push button or other physical input control device instead of a touchpad.

Example Computing Device

Figure 22:
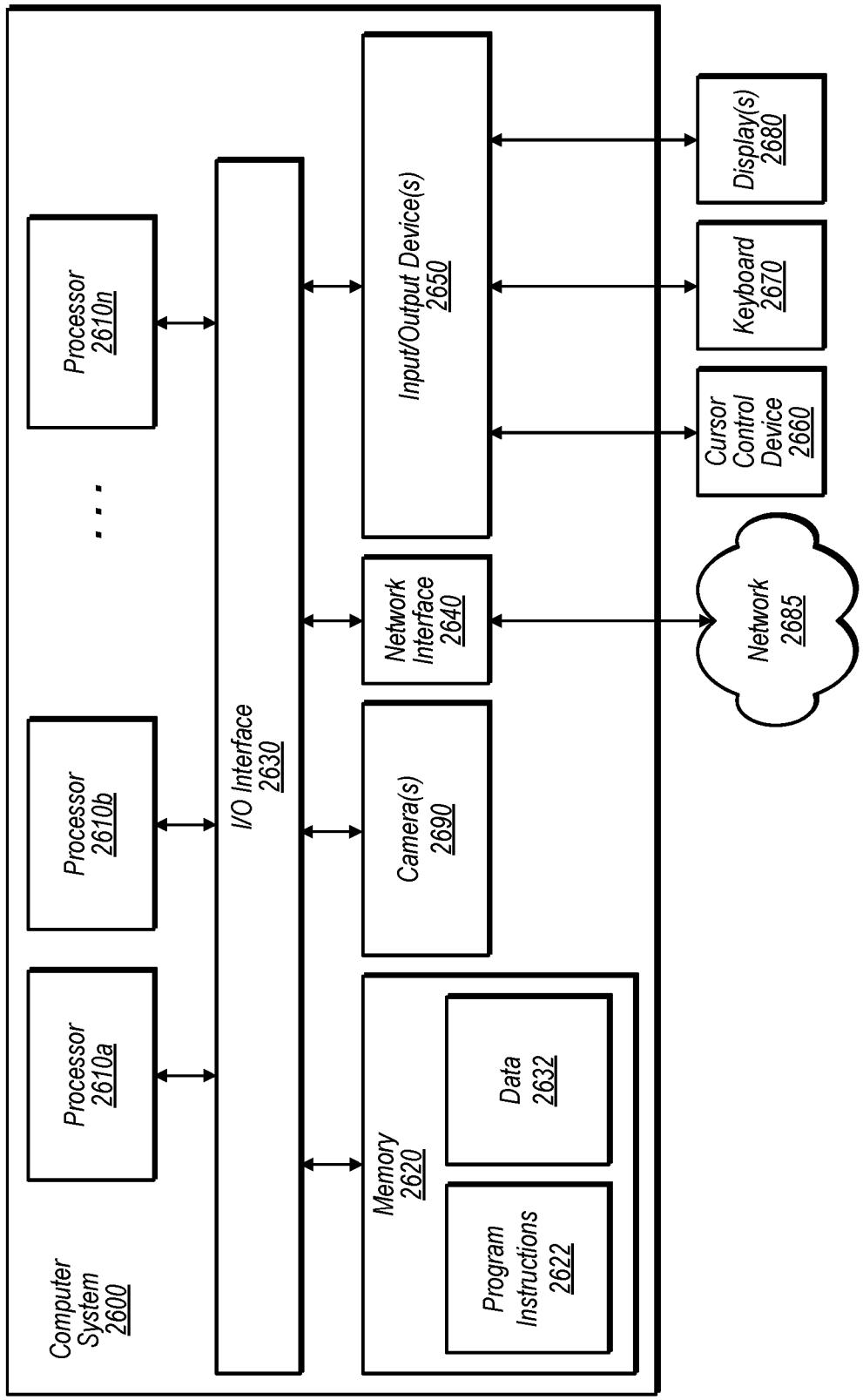
FIG. 22 illustrates an example computing device.

FIG. 22 illustrates an example computing device, referred to as computer system 2600, that may include or host embodiments of a camera as illustrated in FIGS. 1-3. In addition, computer system 2600 may implement methods for controlling operations of the camera and/or for performing image processing of images captured with the camera. In different embodiments, computer system 2600 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2600 includes one or more processors 2610 coupled to a system memory 2620 via an input/output (I/O) interface 2630. Computer system 2600 further includes a network interface 2640 coupled to I/O interface 2630, and one or more input/output devices 2650, such as cursor control device 2660, keyboard 2670, and display(s) 2680. Computer system 2600 may also include one or more cameras 2690, for example one or more cameras as described above with respect to FIGS. 1-3, which may also be coupled to I/O interface 2630, or one or more cameras as described above with respect to FIGS. 1-3 along with one or more other cameras.

In various embodiments, computer system 2600 may be a uniprocessor system including one processor 2610, or a multiprocessor system including several processors 2610 (e.g., two, four, eight, or another suitable number). Processors 2610 may be any suitable processor capable of executing instructions. For example, in various embodiments processors 2610 may be general-purpose or embedded processors implementing any of a variety of instruction set architectures (ISAs), such as the x86, PowerPC, SPARC, or MIPS ISAs, or any other suitable ISA. In multiprocessor systems, each of processors 2610 may commonly, but not necessarily, implement the same ISA.

System memory 2620 may be configured to store program instructions 2622 and/or data 2632 accessible by processor 2610. In various embodiments, system memory 2620 may be implemented using any suitable memory technology, such as static random access memory (SRAM), synchronous dynamic RAM (SDRAM), nonvolatile/Flash-type memory, or any other type of memory. In the illustrated embodiment, program instructions 2622 may be configured to implement various interfaces, methods and/or data for controlling operations of camera 2690 and for capturing and processing images with integrated camera 2690 or other methods or data, for example interfaces and methods for capturing, displaying, processing, and storing images captured with camera 2690. In some embodiments, program instructions and/or data may be received, sent or stored upon different types of computer-accessible media or on similar media separate from system memory 2620 or computer system 2600.

In one embodiment, I/O interface 2630 may be configured to coordinate I/O traffic between processor 2610, system memory 2620, and any peripheral devices in the device, including network interface 2640 or other peripheral interfaces, such as input/output devices 2650. In some embodiments, I/O interface 2630 may perform any necessary protocol, timing or other data transformations to convert data signals from one component (e.g., system memory 2620) into a format suitable for use by another component (e.g., processor 2610). In some embodiments, I/O interface 2630 may include support for devices attached through various types of peripheral buses, such as a variant of the Peripheral Component Interconnect (PCI) bus standard or the Universal Serial Bus (USB) standard, for example. In some embodiments, the function of I/O interface 2630 may be split into two or more separate components, such as a north bridge and a south bridge, for example. Also, in some embodiments some or all of the functionality of I/O interface 2630, such as an interface to system memory 2620, may be incorporated directly into processor 2610.

Network interface 2640 may be configured to allow data to be exchanged between computer system 2600 and other devices attached to a network 2685 (e.g., carrier or agent devices) or between nodes of computer system 2600. Network 2685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2650 may, in some embodiments, include one or more display terminals, keyboards, keypads, touchpads, scanning devices, voice or optical recognition devices, or any other devices suitable for entering or accessing data by computer system 2600. Multiple input/output devices 2650 may be present in computer system 2600 or may be distributed on various nodes of computer system 2600. In some embodiments, similar input/output devices may be separate from computer system 2600 and may interact with one or more nodes of computer system 2600 through a wired or wireless connection, such as over network interface 2640.

As shown in FIG. 22, memory 2620 may include program instructions 2622, which may be processor-executable to implement any element or action to support integrated camera 2690, including but not limited to image processing software and interface software for controlling camera 2690. In some embodiments, images captured by camera 2690 may be stored to memory 2620. In addition, metadata for images captured by camera 2690 may be stored to memory 2620.

Those skilled in the art will appreciate that computer system 2600 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2600 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2600 may be transmitted to computer system 2600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Numerous variations and modifications will become apparent to those skilled in the art once the above disclosure is fully appreciated. It is intended that the following claims be interpreted to embrace all such variations and modifications.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    illuminating a subject in a field of view of a camera system with illumination from a time-of-flight imaging system;
    determining a depth of the subject based on time-of-flight values assessed by the time-of-flight imaging system;
    in response to the depth of the subject being above a depth threshold, determining a focus position of the camera system based on the determined depth of the subject; and
    in response to the depth of the subject being below the depth threshold, operating a contrast based autofocus process to determine the focus position of the camera system.

2. The method of claim 1, wherein the depth is determined for the subject in a region of interest in a scene being captured by the camera system.

3. The method of claim 1, wherein the depth of the subject is determined in response to an illuminance value of the subject being determined to be below a predetermined illuminance threshold.

4. The method of claim 1, further comprising operating a phase detection autofocus process to determine the focus position of the camera system in response to an illuminance value of the subject being determined to be above a predetermined illuminance threshold.

5. The method of claim 1, wherein the focus position of the camera system is determined based on the determined depth of the subject when the depth of the subject is above the depth threshold and a depth-to-position model is converged.

6. The method of claim 1, wherein the focus position of the camera system is determined by operating a contrast based autofocus process to determine the focus position of the camera system when the depth of the subject is above the depth threshold and a depth-to-position model is not converged, the contrast based autofocus process beginning determining the focus position based on the determined depth of the subject.

7. The method of claim 1, further comprising determining a focus position of an additional camera system based on the focus position of the camera system.

8. The method of claim 1, wherein determining the focus position of the camera system based on the determined depth includes translating the determined depth to the focus position using a depth-to-position model implemented in the camera system.

9. A non-transitory computer-readable medium having instructions stored thereon that are executable by a computing device to perform operations, comprising:
   assessing whether a phase detection autofocus process is able to determine a focus position associated with a subject being captured by a camera system;
   in response to an assessment that the phase detection autofocus process fails to determine the focus position:
      illuminating a subject in a field of view of the camera system with illumination from a time-of-flight imaging system;
      determining a depth of the subject based on time-of-flight values assessed by the time-of-flight imaging system;
      determining whether a depth-to-position model is converged;
      in response to the depth-to-position model being converged, determining the focus position of the camera system based on the determined depth of the subject; and
      in response to the depth-to-position model not being converged, operating a contrast based autofocus process to determine the focus position of the camera system.

10. The non-transitory computer-readable medium of claim 9, further comprising determining a focus position of an additional camera system based on the focus position of the camera system.

11. The non-transitory computer-readable medium of claim 9, wherein the depth-to-position model translates the determined depth of the subject to a position of least one lens in the camera system.

12. The non-transitory computer-readable medium of claim 9, wherein determining whether the depth-to-position model is converged includes:
   determining a difference between a first focal length of least one lens in the camera system determined using the depth of the subject and a second focal length of the least one lens in the camera system determined using a phase detection autofocus process; and
   assessing whether the difference is above or below a predetermined difference threshold, wherein the depth-to-position model is converged when the difference is below the predetermined difference threshold.

13. The non-transitory computer-readable medium of claim 9, further comprising:
   assessing whether the determined depth of the subject is above or below a predetermined depth threshold; and
   determining the focus position by beginning a scan of the contrast based autofocus process using the determined depth of the subject when the determined depth is above the predetermined depth threshold.

14. The non-transitory computer-readable medium of claim 13, wherein the contrast based autofocus process begins a scan using the predetermined depth threshold when the determined depth is below the predetermined depth threshold.

15. A device, comprising:
   a computer processor;
   a memory;
   a camera system having at least one lens and an image sensor;
   a time-of-flight imaging system; and
   circuitry coupled to the camera system and the time-of-flight imaging system, wherein the circuitry is configured to:
      determine, using a phase detection autofocus process, a first focus position for the at least one lens while capturing one or more images of a subject;
      illuminate the subject in a field of view of the camera system with illumination from the time-of-flight imaging system;
      determine a depth of the subject based on time-of-flight values assessed by the time-of-flight imaging system;
      estimate, using a depth-to-position model, a second focus position for the at least one lens based on the determined depth of the subject;
      assess a difference between the second focus position and the first focus position; and
      in response to the difference between the second focus position and the first focus position being above a predetermined difference threshold, update the depth-to-position model based on the difference between the second focus position and the first focus position.

16. The device of claim 15, wherein updating the depth-to-position model based on the difference between the second focus position and the first focus position includes repeatedly updating the depth-to-position model based on the difference between the second focus position and the first focus position until the difference between the second focus position and the first focus position is below the predetermined difference threshold.

17. The device of claim 15, wherein updating the depth-to-position model based on the difference between the second focus position and the first focus position includes adjusting offset correction parameters of the depth-to-position model using the difference between the second focus position and the first focus position.

18. The device of claim 15, wherein the circuitry is configured to reduce a frame rate of determining the depth of the subject based on time-of-flight values when the difference between the second focus position and the first focus position moves below the predetermined difference threshold.

19. The device of claim 15, wherein the depth-to-position model implements a thin lens equation to translate the determined depth of the subject to the second focus position for the at least one lens.

20. The device of claim 15, wherein the circuitry is configured to update the depth-to-position model in response to changes in one or more operating parameters of the camera system in combination with the difference between the second focus position and the first focus position being above the predetermined difference threshold.

* * * * *